United States Patent
Kataoka et al.

(10) Patent No.: US 8,996,251 B2
(45) Date of Patent: Mar. 31, 2015

(54) ELECTRIC POWER-STEERING CONTROL DEVICE

(75) Inventors: Motoaki Kataoka, Kariya (JP); Daiji Watanabe, Kariya (JP)

(73) Assignee: Denso Corporation, Kariya (JP)

(*) Notice: Subject to any disclaimer, the term of this patent is extended or adjusted under 35 U.S.C. 154(b) by 202 days.

(21) Appl. No.: 13/597,700

(22) Filed: Aug. 29, 2012

(65) Prior Publication Data

US 2013/0060427 A1  Mar. 7, 2013

(30) Foreign Application Priority Data

Sep. 5, 2011 (JP) ................... 2011-192984

(51) Int. Cl.
*B62D 6/00* (2006.01)
*B62D 11/00* (2006.01)
*B62D 5/04* (2006.01)

(52) U.S. Cl.
CPC .............. *B62D 6/008* (2013.01); *B62D 5/0466* (2013.01)
USPC ................................ 701/41; 701/42; 180/443

(58) Field of Classification Search
CPC .... B62D 5/0463; B62D 6/008; B62D 5/0466; B62D 6/00
USPC ................................ 701/41–42; 180/443, 446
See application file for complete search history.

(56) References Cited

U.S. PATENT DOCUMENTS

| | | | |
|---|---|---|---|
| 5,481,457 A | 1/1996 | Yamamoto et al. | |
| 2002/0157893 A1 | 10/2002 | Pauly et al. | |
| 2005/0103561 A1 | 5/2005 | Endo et al. | |
| 2006/0017413 A1 | 1/2006 | Okamoto et al. | |
| 2007/0017735 A1 | 1/2007 | Kataoka et al. | |
| 2007/0144824 A1 | 6/2007 | Tamaki et al. | |
| 2008/0189014 A1* | 8/2008 | Tanaka et al. | 701/42 |
| 2009/0192679 A1 | 7/2009 | Kobayashi et al. | |
| 2010/0292896 A1 | 11/2010 | Watanabe et al. | |

FOREIGN PATENT DOCUMENTS

| | | |
|---|---|---|
| EP | 2251245 | 11/2010 |
| EP | 22511245 | 11/2010 |
| FR | 2888811 | 7/2006 |

(Continued)

OTHER PUBLICATIONS

Office action dated Jul. 30, 2013 in corresponding Japanese Application No. 2011-192984.

(Continued)

*Primary Examiner* — Helal A Algahaim
*Assistant Examiner* — Nga X Nguyen
(74) *Attorney, Agent, or Firm* — Harness, Dickey & Pierce, PLC

(57) ABSTRACT

A base assist section generates a base assist command so that a steering reaction according to a road surface reaction returns to a steering wheel side. A modifying section generates a torque modifying command for modifying the base assist command so that an unstable movement of a vehicle converges appropriately. A sum of the each command becomes a final assist torque command. The base assist section estimates a road surface force based on the self-generated base assist command and a steering torque actually detected. A target steering torque is generated based on the estimated force, and the base assist command is generated based on a deviation of the target steering torque and the steering torque.

17 Claims, 14 Drawing Sheets

(56) References Cited

FOREIGN PATENT DOCUMENTS

| | | |
|---|---|---|
| FR | 2888811 | 1/2007 |
| JP | 06-344935 | 12/1994 |
| JP | 2002-274405 | 9/2002 |
| JP | 2002-302054 | 10/2002 |
| JP | 2002-369565 | 12/2002 |
| JP | 2003-200844 | 7/2003 |
| JP | 2004-203089 | 7/2004 |
| JP | 2004-299492 | 10/2004 |
| JP | 2006-193080 | 7/2006 |
| JP | 2006-315632 | 11/2006 |
| JP | 2007-008292 | 1/2007 |
| JP | 2007-008293 | 1/2007 |
| JP | 2007-008294 | 1/2007 |
| JP | 2007-022373 | 2/2007 |
| JP | 2007-153249 | 6/2007 |
| JP | 2007-168756 | 7/2007 |
| JP | 2007-290127 | 11/2007 |
| JP | 2008-230528 | 10/2008 |
| JP | 4419840 | 12/2009 |
| JP | 2010-264913 | 11/2010 |

OTHER PUBLICATIONS

Preliminary Search Report dated Jul. 2, 2013 in corresponding French Application No. 1258135 (with English translation).

* cited by examiner

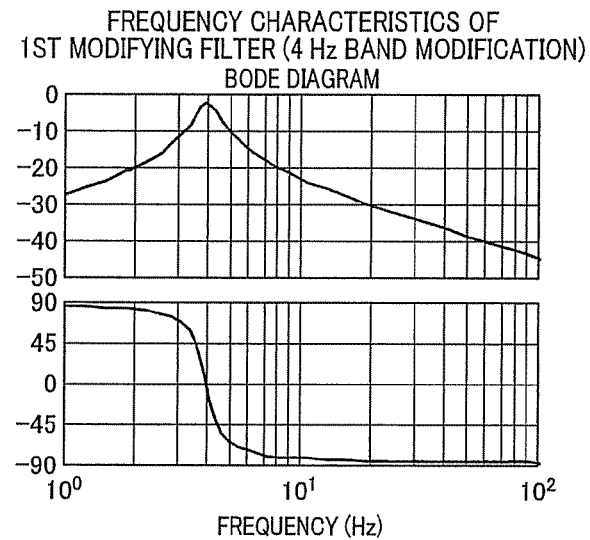
FIG.9A FREQUENCY CHARACTERISTICS OF 1ST MODIFYING FILTER (4 Hz BAND MODIFICATION) BODE DIAGRAM
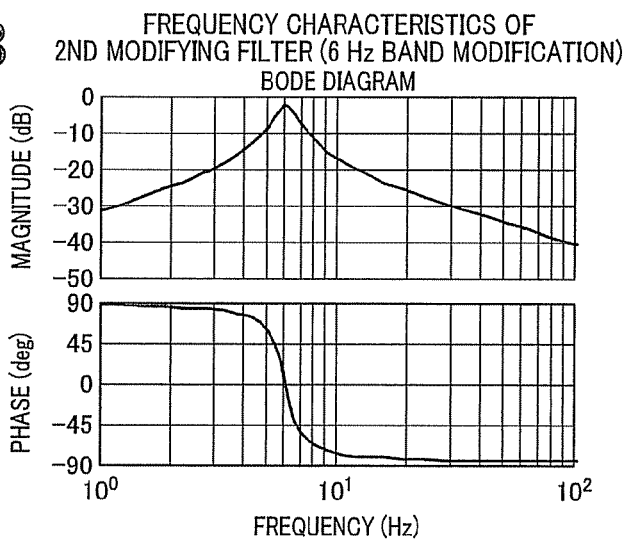
FIG.9B FREQUENCY CHARACTERISTICS OF 2ND MODIFYING FILTER (6 Hz BAND MODIFICATION) BODE DIAGRAM
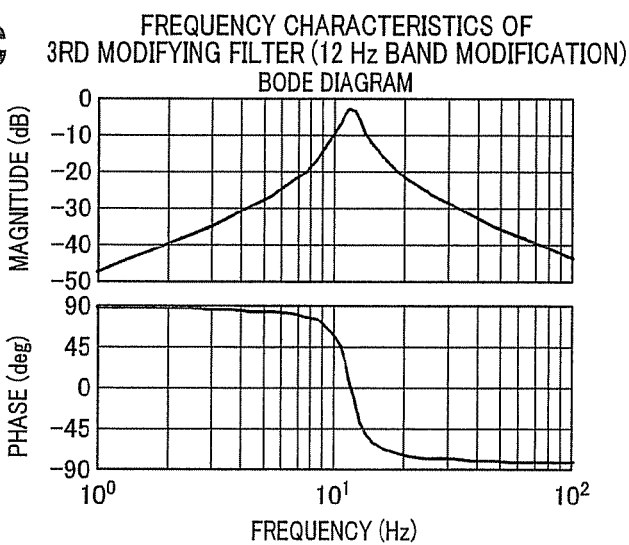
FIG.9C FREQUENCY CHARACTERISTICS OF 3RD MODIFYING FILTER (12 Hz BAND MODIFICATION) BODE DIAGRAM

TRANSFER SYSTEM CHARACTERISTICS OF
STEERING WHEEL TORQUE→STEER TORQUE

ELECTRIC POWER-STEERING CONTROL DEVICE

CROSS-REFERENCE TO RELATED APPLICATION

The application is based on and claims the benefit of priority from earlier Japanese Patent Application No. 2011-192984 filed Sep. 5, 2011, the description of which is incorporated herein by reference.

TECHNICAL FIELD

The present disclosure relates to an electric power-steering control device that controls an electric power-steering system, which assists a steering operation (steering) of a vehicle by a motor.

BACKGROUND

In order for a motor to generate a suitable assist steering power according to a steering operation (steering) of a driver, a control device (an ECU) computes the assist steering power based on various inputs applied to a steering shaft by the steering operation of the driver, such as a steering torque and a vehicle speed, and drives the motor based on the computed assist steering power.

The conventional electric power-steering system basically controls the motor so that the assist steering power applied by the motor becomes larger as the steering torque becomes larger.

When the driver turns a steering wheel, the assist steering power is generated according to the applied steering torque, and so the steering operation becomes lighter.

However, it is difficult to give the driver a correct impression via the steering wheel of the reaction between the road and wheels, only by determining the assist steering power based on the steering torque.

In other words, it is difficult to configure a target steering torque according to the road surface force and generate the assist steering force according to the target steering torque (that is, realizing the target steering torque according to the road surface force) in order to impress on the driver the steering operational feeling according to the road surface force.

On the other hand, a technology that controls a motor based on a deviation of a target steering torque from an actual steering torque is disclosed in Japanese Patent Application Laid-Open Publication No. 2004-203089.

With the technology disclosed in the publication '089, a force (namely, a road surface reaction) given to a tire is acquired by requesting an output torque from a sum of an actual steering torque (torque given by the driver) and an assist torque (torque given by the motor).

Then, the target steering torque is configured according to the obtained output torque (the road surface reaction force).

Thereby, the target steering torque can be determined unambiguously.

Therefore, the target steering torque whose change (namely, change of the road surface reaction force) is compensated for by the output side torque can be configured by considering influences of friction and inertia superimposed on the steering torque when turning sharply the steering wheel, for example, or by modifying based on a vehicle movement state.

However, although the target steering torque is configured considering the road surface reaction in the technology disclosed in the publication '089, the assist torque is generated based on a the torque applied to the steering wheel called steering torque fundamentally.

Therefore, although the required torque on the shaft can be suppressed (that is, the steering operation can be made light), the convergence of the vehicle cannot be secured because, a revolving speed of the motor (revolving speed of the steering shaft) cannot be controlled appropriately in a situation where the twist decreases when returning the steering wheel to a neutral position, for example, or under a situation where the steering wheel reverts to the neutral position with few twists when the hands of the driver separate from the steering wheel after steering.

For example, although it is satisfactory in particular when turning the steering wheel sharply, rotation of the shaft in a direction returning to the neutral position is speeded up because the twist of the shaft returns when steering wheel return and the assist torque also decreases by this, therefore, the stability and the convergence of the vehicle is spoiled.

Although it is good for the driver when operating the steering wheel firmly, a motion of the vehicle becomes sensitive and hard to converge to the desired direction when power applied to the steering wheel is reduced or the hands are separated from the wheel, thus gives a feeling of insecurity to the driver as the vehicle speed gets faster.

Hence, securing the operation stability of the whole vehicle appropriately (realizing the suitable vehicle movement characteristics) is not made with the technology disclosed in the publication '089.

Therefore, the driver must respond to a vibration force that is transmitted to the steering wheel when a movement of the vehicle is unstable, and there is a possibility of interfering with the driving operation.

If damping is used in order to secure convergence, resistance is given when returning the steering wheel and convergence improves, however, resistance is also given when turning the steering wheel deeply, and a steering feeling to the driver is spoiled.

If control actions are changed for the time of turning and the time of returning the steering wheel, respectively, in order to avoid the problem mentioned above, the control processing may become very complicated and conformity between them both may become difficult.

On the other hand, as one of the technologies for securing operation stability appropriately, and as a technology for reducing a sudden feeling of return when returning the steering wheel and raising the convergence of the vehicle direction without spoiling the feeling when turning the steering wheel, a convergence control technology that calculates a fundamental assist steering power (base assist torque) based on the steering torque and the speed of the vehicle, computes a modifying torque for modifying the base assist torque based on the steering torque and the motor speed (rotation angle speed), and modifies the base assist torque by the modifying torque is known, for example, (refer to Japanese Patent Application Laid-Open Publication No. 2010-264913, for example).

That is, while the steering torque is a physical value in which the operation state of the steering wheel by the driver is reflected, the motor speed is a physical value in which the influence of the road surface reaction is also reflected in addition to the operation of turning the steering wheel by the driver.

Therefore, based on the steering torque and the motor speed, a control mechanism can be constituted that can realize the convergence control such that the operational feeling is not spoiled when turning the steering wheel, and the sudden feeling of return of the when to the neutral position by the road surface reaction is reduced when returning the steering wheel.

Therefore, in the publication '913, based on the steering torque and the motor speed, suitable stability (suitable vehicle movement characteristics) of the whole vehicles is realized by preventing the steering feeling of the driver from being spoiled when turning and returning the steering wheel, by generating the assist compensation quantity differently when turning the steering wheel and returning the steering wheel different, and modifying the base assist torque by the assist compensation quantity.

Various technologies for securing operation stability appropriately are proposed, and a torque modifying technology for aiming for a reduction of frequent correction operation and operating duty mitigation by realizing vehicle movement suitable for the intention of the driver is disclosed in Japanese Patent Application Laid-Open Publication No. 2007-22373, for example.

With the technology, a vehicle movement state is estimated based on a sum of the base assist torque and the steering torque, and a quantity of torque modifying the base assist torque is generated so that the characteristics become the desired ones.

Then, in order to reconcile a realization of the characteristics of the steering reaction according to the road surface reaction and a realization of the suitable operation stability (suitable vehicle movement characteristics) as the whole vehicles, it is considered to try the combination of the technologies disclosed in the above-mentioned publications '089 and '913, for example.

Specifically, a control mechanism as shown in FIG. 14 can be built.

In the control mechanism shown in FIG. 14, a current feedback (FB) section 142, gives an assist steering force according to an assist torque command Ta to a steering shaft by driving a motor 110 by applying a drive voltage Vd according to an assist torque command Ta inputted to the motor 110.

In a controlled object (steering system mechanism) 100 from the steering shaft to wheels, a motor speed ω that is a revolving speed of the motor 110 and a steering torque Ts are detected.

The current FB section 142 detects a current that flows into the motor 110 (motor current Im) and performs a current feedback (FB) control so that the value of the current becomes a target current (value matching the assist torque command Ta).

Then, based on the detected motor current Im and the steering torque Ts, a force estimator 121 estimates a road surface force (road surface reaction), and generates an estimated force Tx as an estimated value.

Then, a base assist section 120 generates a base assist command Tb* based on the estimated force Tx.

The base assist section 120 specifically has a target generating section 122 that generates a target steering torque Ts* based on the estimated force Tx, a deviation computer 123 that computes the difference (torque deviation) between the steering torque Ts and the target steering torque Ts*, and a controller 124 that generates a base assist command Tb* for controlling the motor 110 (that is, a torque feedback control is performed) based on the torque deviation so that the steering torque Ts matches the target steering torque Ts*.

Thus, by controlling the motor 110 by the obtained base assist command Tb*, realization of the characteristics of the steering reaction according to the road surface reaction becomes possible.

That is, the target generating section 122 configures the target steering torque Ts* according to the road surface force relative to the road surface reaction that the force estimator 121 estimated.

Then, the driver can feel the response according to the road surface force because the controller 124 performs the torque feedback control so that the actual steering torque Ts becomes the target steering torque Ts*.

On the other hand, a modifying section 130 has a torque modifying section 131 that generates a torque modifying command Tr based on the steering torque Ts and the motor speed ω, and realizes the convergence control.

A specific composition and function of the torque modifying section 131 are the same as that of a controller disclosed in the publication '913 mentioned above.

Therefore, by modifying the base assist command Tb* by the torque modifying command Tr obtained in the modifying section 130 (here, both are added with an adder 141), and if the modifying result as the assist torque command Ta is given the current FB section 142, realizing the suitable operation stability (suitable vehicle movement characteristics) as the whole vehicle becomes possible for the time being.

However, at least one big problem exists in the control mechanism shown in FIG. 14.

The problem is that the base assist section 120 cancels the modifying operation by the modifying section 130.

That is, in the control mechanism shown in FIG. 14, force estimation with the force estimator 121 is performed based on the motor current Im finally supplied to the motor.

The motor current Im responds to the assist torque command Ta that is modified by the torque modifying command Tr that the modifying section 130 generated to the base assist command Tb* that the base assist section 120 generated.

That is, the force estimator 121 estimates the road surface force using the motor current Im as a result modified by the modifying section 130.

In other words, when steering a steering wheel sharply, for example, the base assist command Tb* is modified so that the assist steering power decreases by the convergence control in the modifying section 130.

Then, the motor current Im falls for the amount of the modification, and thereby, the force estimated value (estimated force Tx) by the force estimator 121 also falls.

Then if the estimated force Tx falls, the target steering torque Ts* also falls, and by this, the controls base assist command Tb* increases, i.e., the assist steering power is controlled in a tendency of increasing so that the steering torque becomes small.

That is, even though the torque modifying command Tr is generated convergence control by the modifying section 130 in order to reduce the assist steering power, the assist steering power is controlled conversely in a tendency of increasing by the base assist section 120.

As a result, the convergence control by the modifying section 130 is not reflected (convergence control is canceled by the base assist section 120).

Thus, with the control composition shown in FIG. 14, it is incompatible in a realization of the characteristics of the steering reaction according to the road surface reaction, and in a realization of the suitable operation stability (suitable vehicle movement characteristics) as the whole vehicles.

Therefore, it is difficult to raise a running performance of the vehicle, i.e., it is difficult to enable the driver to drive the vehicle intuitively, and feels reliable to operate the vehicle.

SUMMARY

An embodiment provides an electric power-steering control device that can provide feedback to the driver of the reaction between the road and vehicle while ensuring suitable stability for the vehicle while moving.

In an electric power-steering control device according to a first aspect, the electric power-steering control device includes an input shaft that is connected with a steering wheel of a vehicle and rotates with the steering wheel, an input transmitting means that steers steered wheels of the vehicle by transmitting rotation of the input shaft to the steered wheels, a steering torque detecting means that detects a steering torque which is a torque applied to the input shaft in an axis rotatory direction, and a motor that provides an assist steering power to the input shaft or the input transmitting means for assisting an operation of turning the steering wheel when steering the steered wheels by an operation of turning the steering wheel.

The electric power-steering control device that controls the assist steering power by controlling the motor is provided in an electric power-steering system.

The electric power-steering control device further includes a basic assist quantity generating means that generates a basic assist quantity for assisting the operation of turning the steering wheel based on the steering torque detected by the steering torque detecting means so that the steering torque changes according to a road surface force applied to the steered wheels from a road surface, an assist compensation quantity generating means that generates an assist compensation quantity for modifying the basic assist quantity computed by the basic assist quantity generating means so that an action of the steered wheels responds to predetermined action characteristics, an assist quantity modifying means that generates a modified assist quantity by modifying the basic assist quantity generated by the basic assist quantity generating means with the assist compensation quantity generated by the assist compensation quantity generating means, and a motor driving means that drives the motor based on the modified assist quantity from the assist quantity modifying means.

The basic assist quantity generating means has a road surface force estimating means which estimates the road surface force based on the steering torque detected by the basic assist quantity and the steering torque detected by steering torque detecting means that both are generated results of the basic assist quantity generating means itself, a target steering torque computing means computes a target steering torque that is a desired value of the steering torque based on the estimated force that is the road surface force estimated by the road surface force estimating means, and a basic assist quantity computing means that computes the basic assist quantity for controlling the motor so that the steering torque detected by the steering torque detecting means matches the target steering torque computed by the target steering torque computing means.

According to the electric power-steering control device mentioned above, the function to configure the target steering torque according to the estimated force by estimating the road surface force is closed within one loop (basic assist quantity computing means), and the function is separated from the assist compensation quantity generating means in the present embodiment so that interference between the basic assist quantity computing means and the assist compensation quantity generating means can be minimized (or removed completely).

By this, providing a suitable steering reaction according to the road surface force by the basic assist quantity computing means and realization of suitable operation stability (suitable vehicle movement characteristics) for the vehicle by the assist compensation quantity generating means can be reconciled, hence the running performance of the vehicle can be improved.

In the electric power-steering control device according to a second aspect, the road surface force estimating means extracts an element of a frequency band configured beforehand from a sum of the basic assist quantity and the steering torque, and outputs the ingredient of the extracted frequency band as the estimated force.

Thus, by obtaining the estimated force, an unnecessary frequency component such as an ingredient of a band that the driver of the vehicle feels as unpleasant can be removed, for example, and only a frequency component that should be transmitted to the driver can be transmitted.

In the electric power-steering control device according to a third aspect, the frequency band is 10 Hz or less.

In the electric power-steering control device according to a fourth aspect, the target steering torque computing means computes the target steering torque so that the larger the estimated force becomes, the target steering torque also becomes larger based on the estimated force estimated by the road surface force estimating means.

By computing the target steering torque in this way, the steering reaction force according to the road surface force can be appropriately transmitted to the steering wheel side (driver side).

In the electric power-steering control device according to a fifth aspect, the target steering torque computing means computes the target steering torque so that the target steering torque changes logarithmically relative to the estimated force.

Generating the target steering torque in logarithmic form relative to the estimated force, it can be said that, so to speak, it is a technique based on a human perception model that shows the quantity that the steering reaction force relative to the road surface force should have.

Therefore, a natural steering sense can be given to the driver by computing the target steering torque in logarithm relative to the estimated force.

In the electric power-steering control device according to a sixth aspect, the electric power-steering system has a speed detecting means that detects a running vehicle speed, and the target steering torque computing means computes the target steering torque so that the faster the speed becomes, the target steering torque becomes larger based on the vehicle speed detected by the speed detecting means.

In the electric power-steering control device according to a seventh aspect, the target steering torque computing means computes the target steering torque so that the target steering torque changes logarithmically relative to the vehicle speed.

Thus, by generating the target steering torque not only relative to the estimated force but also relative to the vehicle speed that changes logarithmically, the natural steering sense can be given to the driver when speed change also.

In the electric power-steering control device according to an eighth aspect, the basic assist quantity computing means has a deviation computing means that computes a torque deviation that is a difference between the steering torque detected by the steering torque detecting means and the target steering torque computed by the target steering torque computing means, and at least one basic command computing means that computes a basic command that corresponds to the basic assist quantity so that the torque deviation computed by the deviation computing means is configured to 0.

When more than one basic command computing means is provided, a weighted sum of the basic commands computed by each basic command computing means is computed as the basic assist quantity, and the basic command computing means is constituted so that a transfer function of the basic assist quantity to be outputted relative to the torque deviation inputted becomes more than a predetermined level with a gain larger than 1 in the band below a predetermined frequency.

Thus, the steering torque can easily follow the target steering torque by computing the basic command (as a result, the basic assist quantity is computed) by using the basic command computing means that becomes more than a predetermined level (high gain) with the gain larger than 1 in the band below a predetermined frequency.

Moreover, when there are a plurality of the basic command computing means with different frequency characteristics which compute the basic assist quantity by using each basic command to produce a weighted sum, a transmission feeling and a steering feel of the road surface force when steering operation can be configured as the required characteristics by configuring suitably the characteristics of each basic command computing means or weight of each basic command.

In the electric power-steering control device according to a ninth aspect, the basic command computing means has an integration means that integrates and outputs the torque deviation inputted, and it is constituted that the basic command is computed so that the torque deviation becomes 0.

Thus, by having such an integration means, the transfer function of the gain of a basic command computing means comes to have characteristics higher at low frequencies, i.e., the gain rises as the frequency approaches 0.

Thus, the steering torque more easily follows the target steering torque.

However, when the integration means is employed, the integration value will rise rapidly if following of actual steering torque continues delaying relative to the target steering torque.

Then, if the integration value becomes too large, the assistance in the turning direction will be delayed under the influence of the large integration value when the steering wheel is turned, for example.

In the electric power-steering control device according to a tenth aspect, the integration means is constituted so that the absolute value of the integration value outputted is restricted to below a predetermined integration upper limit.

That is, even if the following to the target does not progress and the integration value continues rising or descending, a maximum of the absolute value is configured to be the integration upper limit.

Thus, by configuring the maximum in the absolute value of the integration value, blocking of the steering in a direction of changing the assistant direction when the integration value increases can be suppressed.

In the electric power-steering control device according to an eleventh aspect, the steering torque detected by the steering torque detecting means, a rotation angle of the steering wheel, a rotation angle of the motor, or the basic assist quantity generated by the basic assist quantity generating means is used as a quantity of state for a configuration, and the integration upper limit is configured to be a larger value as the quantity of state for the configuration becomes larger.

Thereby, a configuration of the suitable integration upper limit according to the state of the vehicle becomes possible.

In the electric power-steering control device according to a twelfth aspect, the predetermined frequency is 1 Hz.

In the electric power-steering control device according to a thirteenth aspect, the predetermined level is 10 times.

In the electric power-steering control device according to a fourteenth aspect, the basic assist quantity computing means has a plurality of the basic command computing means with different frequency characteristics, and a first weighted sum calculating means that calculates the weighted sum of the basic command from the plurality of the basic command computing means according to a first weighting configuring command.

Thus, by using each basic command from a plurality of the basic command computing means with different frequency characteristics to produce a weighted sum, the transmission feeling and the steering feel of the road surface force when steering operation can be configured as the required characteristics more finely.

In the electric power-steering control device according to a fifteenth aspect, a steering speed information acquisition means is provided for acquiring steering speed information that directly or indirectly shows a revolving speed of the motor, and the assist quantity modifying means generates the assist compensation quantity for converging a movement of the vehicle to the desired behavior based on at least one of the steering speed information acquired by the steering speed information acquisition means, the steering torque detected by the steering torque detecting means, and the road surface force estimated by the road surface force estimating means.

It can be said that the steering torque is the information relating to the steering wheel, the steering speed information is the information by the side of the steering wheel and the road surface, and the road surface force (estimated force) is the information by the side of the road surface.

Therefore, by generating the assist compensation quantity based on at least one among these, the assist compensation quantity for converging and stabilizing the movement of the vehicle can be generated appropriately and the basic assist quantity can be appropriately modified based on the assist compensation quantity.

In the electric power-steering control device according to a sixteenth aspect, the assist quantity modifying means has at least one basic compensation quantity computing means for computing the basic compensation quantity corresponding to the assist compensation quantity for converging the movement of the vehicle, and when there is more than one basic compensation quantity computing means, a weighted sum of each compensation quantity computed by the each basic compensation quantity computing means is computed as the basic assist quantity.

Thus, if the assist compensation quantity is designed to be computed by giving using a weighted sum of each basic compensation quantity when the plurality of the basic compensation quantity computing means is provided, transient characteristics when converging and stabilizing the movement of the vehicle can be obtained as the required characteristics by configuring suitably the characteristics of each basic compensation quantity computing means or weight of each compensation quantity.

BRIEF DESCRIPTION OF THE DRAWINGS

In the accompanying drawings:

FIG. 9A to FIG. 9C are characteristics diagrams showing frequency characteristics of each modifying filter that constitutes the controller section;

DETAILED DESCRIPTION OF THE PREFERRED EMBODIMENTS

With reference to the drawings, hereinafter will be described an embodiment of the present disclosure in detail.

Figure 1:
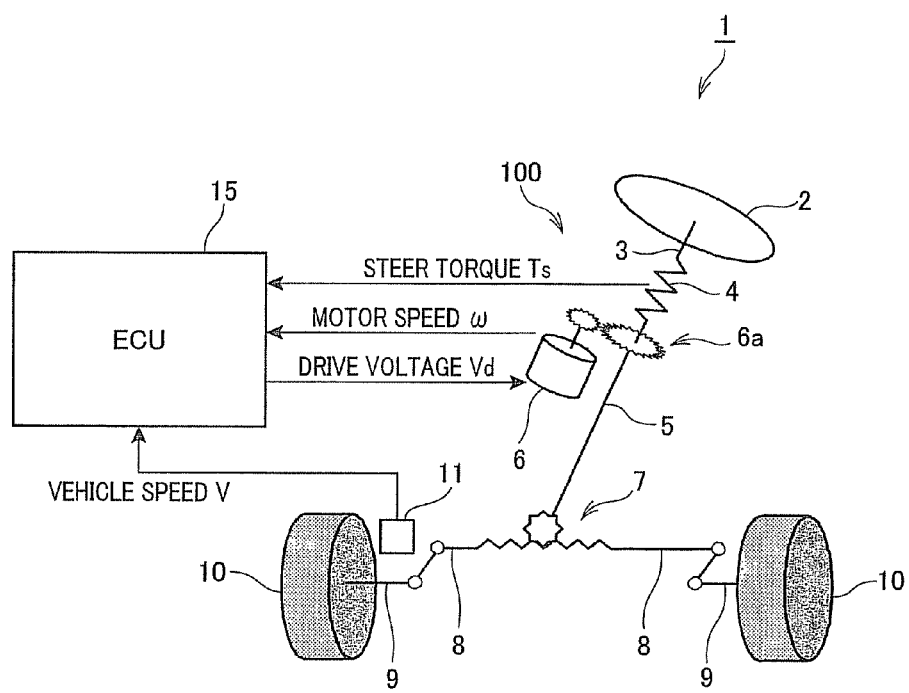
FIG. 1 is a block diagram showing a schematic structure of an electric power-steering system of an embodiment.

As shown in FIG. 1, an electric power-steering system 1 of the present embodiment assists an operation of a steering wheel 2 by a driver with a motor 6.

The steering wheel 2 is fixed to one end of a steering shaft 3, one end of a torque sensor 4 is connected to another end of the steering shaft 3, and one end of an intermediate shaft 5 is connected to another end of the torque sensor 4.

In addition, the entire axial unit from the steering shaft 3 to the intermediate shaft 5 through the torque sensor 4 is also collectively called a steering wheel shaft in the following explanation.

The torque sensor 4 is a sensing device for detecting steering torque Ts. The torque sensor 4 corresponds to a steering torque detecting means of the present disclosure.

Specifically, the torque sensor 4 has a torsion bar spring that connects the steering shaft 3 and the intermediate shaft 5, and detects the torque being applied to the torsion bar spring based on a twist angle of the torsion bar spring.

The motor 6 is for assisting a steering power of the steering wheel 2, and a rotation of the motor 6 is transmitted to the intermediate shaft 5 through a speed reducer 6a.

Namely, the speed reducer 6a is constituted by a worm gear disposed at a tip of a rotational shaft of the motor 6, and a worm wheel disposed to the intermediate shaft 5 coaxially that meshes with the worm gear. The rotation of the motor 6 is transmitted to the intermediate shaft 5 by the speed reducer 6a.

On the contrary, when the intermediate shaft 5 is rotated by the operation of turning the steering wheel 2 or a reaction from a road surface (road surface reaction), the rotation is transmitted to the motor 6 through the speed reducer 6a, hence the motor 6 is rotated.

Moreover, the motor 6 is a brushless motor provided with a rotation sensor such as a resolver inside, and is constituted so that an output of a rotation state of the motor 6 is made possible in the present embodiment.

The motor 6 of the present embodiment is constituted so that at least an output of motor speed ω (information that shows rotation angle speed) is made possible as a rotation state from the rotation sensor.

Another end of the intermediate shaft 5, which is an end opposite to the end connected to the torque sensor 4, is connected to a steering gear box 7.

The steering gear box 7 is constituted of gearing systems that is constituted of a rack and a pinion gear, and teeth of the rack are meshed with the pinion gear disposed in the other end of the intermediate shaft 5.

Therefore, when the driver turns the steering wheel 2, the intermediate shaft 5 rotates (that is, the pinion gear rotates), and, thereby, the rack moves in a right-and-left direction.

Tie rods 8 are attached to both ends of the rack, respectively, and the tie rods 8 reciprocate in the right-and-left direction with the rack.

Thereby, each tire 10 that is a steered wheel changes its direction by the tie rod 8 pulling or pushing a knuckle arm 9 disposed beyond the tie rod 8.

Moreover, a speed sensor 11 as a speed detecting means for detecting a vehicle speed V is disposed in a predetermined position in the vehicle.

By such composition, when the driver turns the steering wheel 2, the rotation is transmitted to the steering gear box 7 through the steering shaft 3, the torque sensor 4, and the intermediate shaft 5.

Moreover, the rotation of the intermediate shaft 5 is transferred into right-and-left movement of the tie rods 8 in the steering gear box 7 and both the tires 10 on either side of the vehicle are steered by the movement of the tie rods 8.

There is provided an ECU 15 that operates by an electric power from an in-vehicle battery (not shown).

The ECU 15 computes an assist torque command Ta based the steering torque Ts detected by the torque sensor 4, the motor speed ω of the motor 6, and the vehicle speed V detected by the speed sensor 11.

An assist quantity of the power in which the driver turns the steering wheel 2 (consequently, power that steers both the tires 10) is controlled by applying a drive voltage Vd according to the computed result to the motor 6.

Since the motor 6 used in the present embodiment is a brushless motor, the drive voltage Vd outputted (applied) to the motor 6 from the ECU 15 is, in detail, the drive voltage Vdu, Vdv, and Vdw of three phases (U, V, W).

The rotation of the motor 6 is controlled by applying the drive voltage Vdu, Vdv, and Vdw of each phase (energizing a drive current of each phase) from the ECU 15 to the motor 6.

Since a method of driving a brushless motor on the drive voltage of three phases (for example, PWM drive) or a drive circuit that generates the drive voltage of the three phases (for example, three-phase bipolar drive circuit) is well known, the detailed explanation is omitted here.

Although the ECU 15 directly controls the motor 6 by controlling the drive voltage Vd applied to the motor 6, it can be said that it controls a steering system mechanism 100 driven by the motor 6 as a result of controlling the motor 6, and, therefore, it can be said that a controlled object of the ECU 15 is the steering system mechanism 100.

In addition, the steering system mechanism 100 shows a whole mechanism among the system diagram shown in FIG. 1 except the ECU 15, i.e., the entire mechanism where the steering power of the steering wheel 2 is transmitted from the steering wheel 2 to each tire 10.

Figure 2:
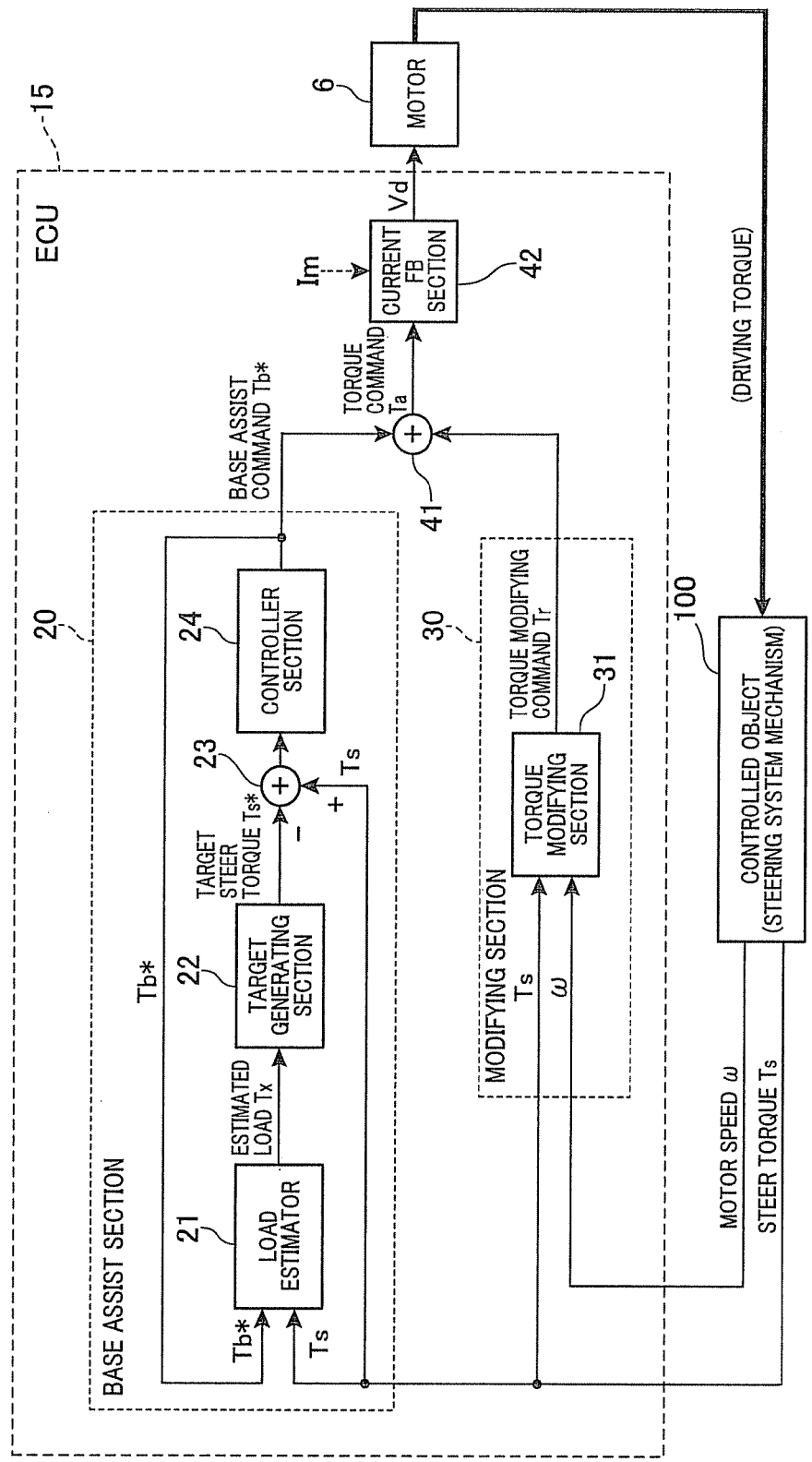
FIG. 2 is a block diagram showing a schematic structure of a control mechanism of an ECU.
Figure 3:
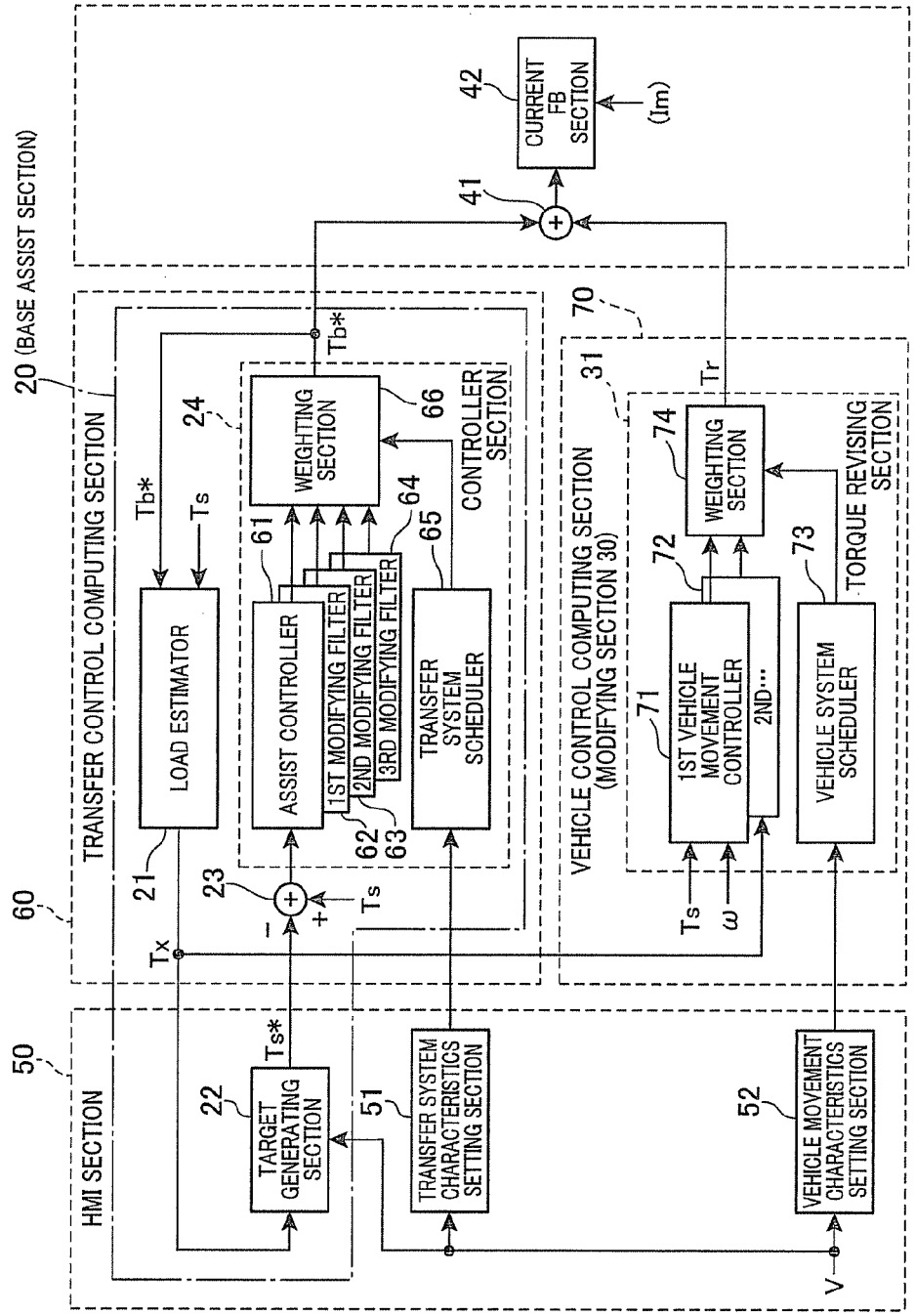
FIG. 3 is a block diagram showing a more specific composition of the control mechanism of FIG. 2.

Next, the schematic structure (control mechanism) of the ECU 15 is explained using the block diagrams of FIG. 2 and FIG. 3.

In addition, among the control mechanisms of the ECU 15 shown in FIG. 2 and FIG. 3, in fact, each section except a current feedback (FB) section 42 and a part of function of the current FB section 42 are realized when a CPU (not shown) with which the ECU 15 is equipped runs a predetermined control program.

That is, FIG. 2 and FIG. 3 show various functions realized by the CPU for every functional block.

However, it is only an example that the control mechanism shown in each figure is realized by software, and needless to mention that the whole control mechanism or a part of it shown in FIG. 2 may be realized, for example, by hardware, such as a logic circuit, for example.

The ECU 15 includes, as shown in FIG. 2, a base assist section 20 that generates a base assist command Tb*, an modifying section 30 that generates an torque modifying command Tr, an adder 41 that generates an assist torque command Ta by adding the base assist command Tb* and the torque modifying command Tr, and the current feedback (FB) section 42 that drives the motor 6 by applying the drive voltage Vd to the motor 6 based on the assist torque command Ta.

The base assist section 20 is a block for realizing characteristics of a steering reaction (steering torque) according to a road surface reaction (road surface force), that is, for realizing the driver to grasp conditions of the vehicle and the road surface easily by transmitting the reaction corresponding to the road surface force semi-regularly to the driver. The base assist section 20 has a force estimator 21, a target generating section 22, a deviation computer 23, and a controller section 24.

That is, the base assist section 20 generates the base assist command Tb* for assisting the operation of turning the steering wheel 2 based on the steering torque Ts so that that the steering torque Ts changes according to the road surface force applied to each tire 10 from the road surface.

The force estimator 21 estimates the road surface force based on the base assist command Tb* and the steering torque Ts.

The target generating section 22 generates target steering torque Ts* that is a target value of the steering torque based on the road surface force (estimated force Tx) estimated by the force estimator 21.

The deviation computer 23 computes torque deviation that is a difference between the steering torque Ts and the target steering torque Ts*.

Further, based on the torque deviation, the controller section 24 generates the base assist command Tb* that shows the assist steering power (also called assist torque or assist quantity) for generating the assist steering power according to the road surface force so that the torque deviation is set to 0.

Since the base assist command Tb* generated accordingly is the torque command for generating the assist steering power according to the road surface force, it is also possible to realize at least the characteristics of the steering reaction according to the road surface force only by inputting the base assist command Tb* into the current FB section 42.

On the other hand, the modifying section 30 is a block for realizing a stable operation (vehicle movement characteristics) of the whole vehicle, i.e., to make a movement of the vehicle (action when steering each tire 10) to have a desired action characteristics (specifically, the vehicle converges appropriately) by suppressing unstable actions (vibrating action, etc.) transmitted to the steering wheel caused by the action of the unstable vehicle. The modifying section 30 has a torque modifying section 31.

The torque modifying section 31 generates a torque modifying command Tr for suppressing (convergence) the unstable actions mentioned above based on the steering torque Ts and the motor speed ω.

Then, the assist torque command Ta is generated by adding the base assist command Tb* generated in the base assist section 20 and the torque modifying command Tr generated in the modifying section 30 with the adder 41.

Then, the current FB section 42 applies the drive voltage Vd to the motor 6 based on the assist torque command Ta so that the torque (assist steering force) corresponding to the assist torque command Ta is given to the steering wheel shaft (especially to a tire 10 side from the torque sensor 4).

Specifically, a target current (target current for every phase) that should be energized to each phase of the motor 6 is set up based on the assist torque command Ta.

Then, desired assist steering power is generated to the steering wheel shaft by detecting and feed-backing the energized current value Im of each phase, and controlling the drive voltage Vd (suppressing energized current) so that detected values (energized current Im of each phase) match with target currents, respectively.

Figure 14:
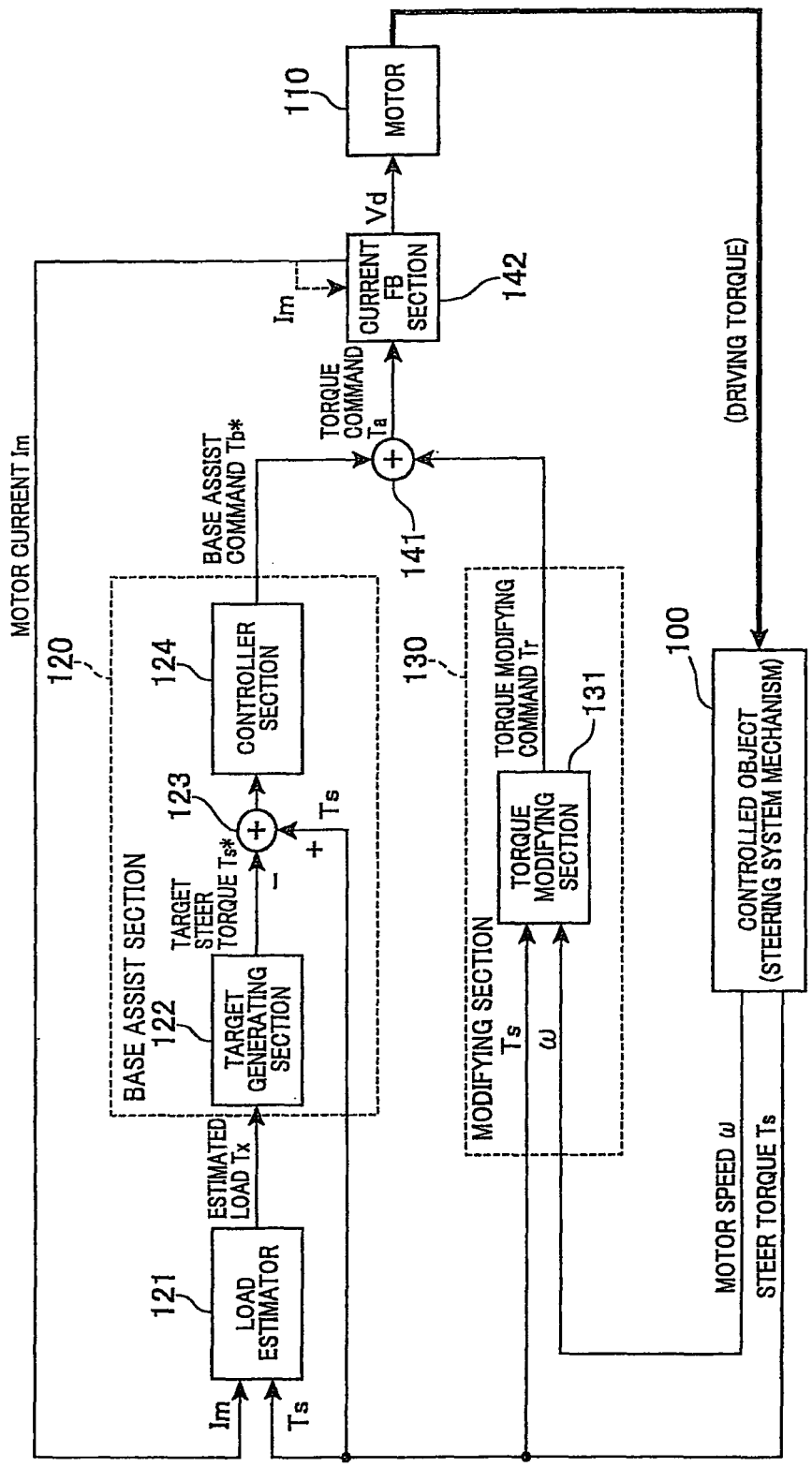
FIG. 14 is a block diagram showing an example of a control mechanism considered from a combination of conventional control mechanisms.

As compared with the control mechanism shown in FIG. 14, it is clear that calculation of the estimated force Tx by the force estimator 21 is performed not based on the motor current Im but based on the base assist command Tb* in the control mechanism of the present embodiment.

That is, the function of the base assist section 20 that generates the base assist command Tb* is closed in the base assist section 20, and is independent from the various functions of other sections such as the modifying sections 30 or the current FB section 42.

Therefore, interference and influence to the base assist command Tb* by the adjusted computed value of the modifying section 30 are minimized.

It should be appreciated that the control mechanism of the ECU 15 of the present embodiment shown in FIG. 2 is simplified in order to explain the main composition and the function of the control mechanism of the present embodiment first of all, and the vehicle speed V is omitted.

In addition, the control mechanism of the present embodiment is in fact provided with a functional block (a transfer system characteristics setting section 51, refer to FIG. 3) that sets transitional characteristics (transfer system characteristics) relative to the road surface reaction in the base assist section 20 according to the vehicle speed V and the base assist command Tb* according to the transfer system characteristics as generated by the controller section 24.

Moreover, there is in fact provided with another functional block (a vehicle movement characteristics setting section 52, refer to FIG. 3) that sets a transitional characteristics (vehicle movement characteristics) over a vehicle movement in the modifying section 30 according to the vehicle speed V and the torque modifying command Tr according to the vehicle movement characteristics is generated by the torque modifying section 31.

Here, a more detailed control mechanism of the ECU 15 is shown in FIG. 3.

The control mechanism shown in FIG. 3 is the more detailed control mechanism shown in FIG. 2.

Specifically, each above-mentioned functional block (the transfer system characteristics setting section 51 and the vehicle movement characteristics setting section 52) together with the target generating section 22 in the basis assist part 20 are grouped as an HMI (Human Interface) section 50, while each composition except the target generating section 22 among the base assist sections 20 is summarized and called a transfer control computing section 60, and the modifying section 30 is called a vehicle control computing section 70.

Furthermore, the composition of the controller section 24 in the transfer control computing section 60 and the torque modifying section 31 in the vehicle control computing section 70 are more embodied.

Hereafter, the composition of the control mechanism of the present embodiment is explained in more detail using FIG. 3.

Figure 4:
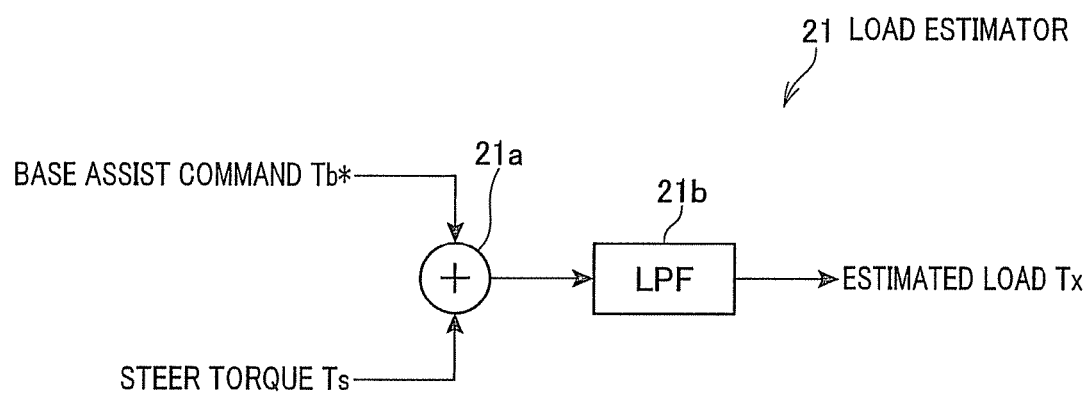
FIG. 4 is a block diagram showing a schematic structure of a force estimator.

The force estimator 21 has, as shown in FIG. 4, an adder 21a that adds the base assist command Tb* and the steering torque Ts and a low pass filter (LPF) 21b that extracts components of a band below predetermined frequency from the addition result, and frequency components extracted by the LPF 21b are outputted as the estimated force Tx.

Generally, drivers are driving vehicles with the help of the steering reaction information of 10 Hz or less, and a frequency component higher than that, a vibration of the band of about 10 Hz to 20 Hz of unsprung parts (circumferences of the wheels and suspensions), for example, is known to cause discomfort to drivers.

Therefore, the cutoff frequency of the LPF 21b is set to roughly 10 Hz so that such unpleasant vibration is not transmitted to the drivers in the present embodiment, and the frequency component of 10 Hz or less is passed (extracted) while a frequency component higher than 10 Hz is intercepted.

Next, the target generating section 22 generates target steering torque Ts* producing a heavy or light steering feeling for the driver according to the road surface reaction, and realizing a rising degree (slope) of the steering reaction (or steering torque) of the driver corresponding to a rise of the road surface reaction.

Figure 6:
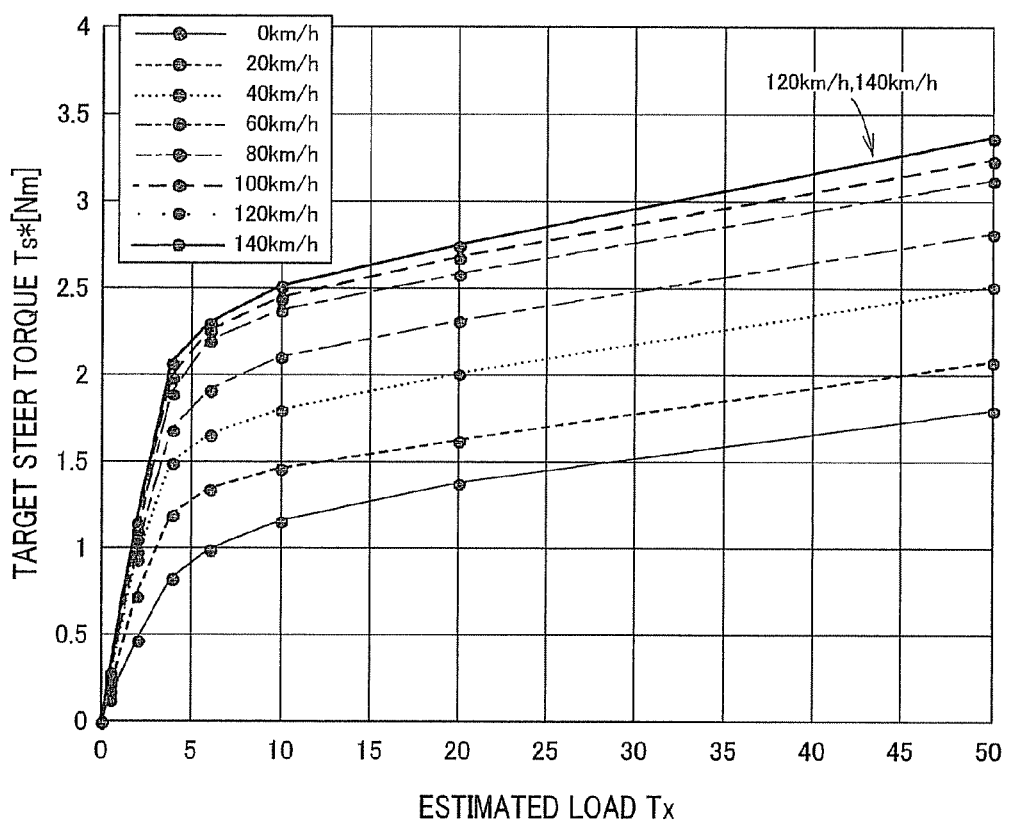
FIG. 6 is a diagram showing a map for target steering torque generation set as a target generating section.

In the target generating section 22 of the present embodiment, the estimated force Tx and the target steering torque Ts* according to the vehicle speed V are in fact mapped, as shown in FIG. 6, and the target steering torque Ts* is generated based on the map.

Here, a derivation process (resolution principle of the target steering torque Ts* generation) of a map generation in FIG. 6 is explained.

Clearly known from the composition of the force estimator 21 shown in FIG. 4, main ingredients of the estimated force Tx are based on the sum of the steering torque Ts and the base assist command Tb*.

That is, the estimated force Tx is force applied to the intermediate shaft 5 through the rack and pinion gear from the tires 10, and corresponds to the reaction received from the road surface when steering.

When the estimated force Tx is approximately defined as the road surface reaction, the road surface reaction will increase as the driver turns the steering wheel.

Then, the road surface reaction force when running with turning is proportional to a steering angle statically in a vehicle linear zone (sufficiently linear zone where the grip power of the tire does not reach saturation).

Here, assuming assistance is performed so that the steering torque becomes proportional to the road surface reaction, the steering torque will increase in proportion to a steering angle of the steering wheel.

Then, although the driver feels the steering torque is light near neutral position, the driver tends to feel the steering become heavy rapidly as the steering wheel is turned deeply.

According to Weber-Fechner law, people's perception is known to be frequently expressed by the logarithm of a physical stimulus, such as: perceived quantity=A log (quantity of stimuli)+B.

When people feel a vehicle's turning movement, the reaction such as a steering torque that is transmitted to one's hands, and force and speed such as lateral acceleration and yaw rate that act on human bodies become the stimulus.

In order to feel a linear change in the feelings obtained by such stimulus, it is suggested that the stronger the intensity of the stimuli, the stimulus needs to show a big change.

When the steering wheel is turned at a fixed speed and when the rate of change of a stimulus is constant, the larger the turning degree (stronger the stimulus), the driver feels the wheel is not turning enough, and feels that the reaction increases too much compared with a feeling of turning.

This is considered as the reason why the driver tends to feel that the steering becomes heavy rapidly as the steering wheel is turned sharply.

Therefore, the present embodiments are considered to give better feedback to the driver of the forces actually imposed on the vehicle.

The lateral acceleration and the yaw rate are proportional to the steering angle of the steering wheel statically like the road surface reaction in the vehicle linear region.

Therefore, in order to match the vehicle movement and steering 'feel' when turning, the steering torque must become related to the road surface reaction logarithmically.

That is, the steering torque Ts* must be prescribed to the estimated force Tx in the logarithmic function (so as to change Logarithmically).

Specifically, for example, in $|Tx|>0$, the target steering torque Ts* can be prescribed in the following formula (1).

$$Ts^* = sgn(Tx) \times (A \log(|Tx|) + B) \quad (1)$$

Figure 5A:
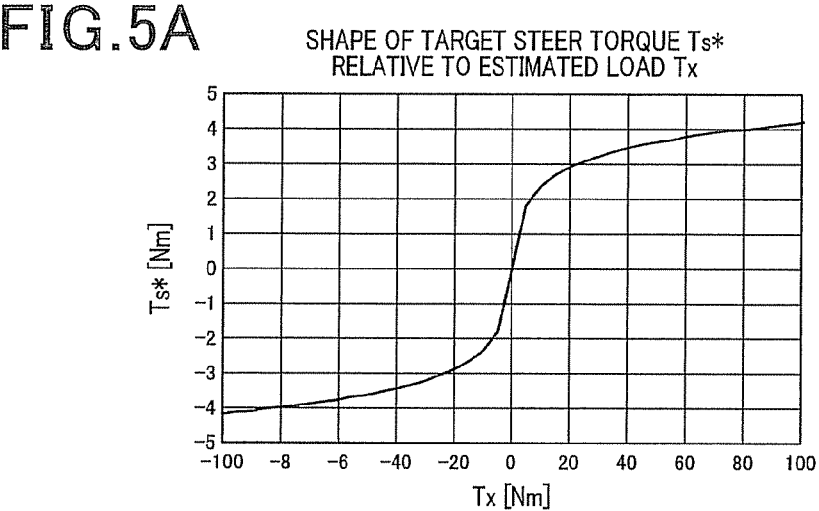
FIG. 5A to FIG. 5D are diagrams for explaining a generation principle of target steering torque.

In the formula (1), the target steering torque Ts* for the estimated force Tx is obtained when A=0.8 and B=0.5 as an example and when Ts*=0 in Tx=0, as shown in FIG. 5A.

The characteristics shown in the FIG. 5A can be said to be a human feeling model that shows a quantity that the steering reaction should have over the road surface force.

Furthermore, when generating the target steering torque Ts*, a value to compensate for the driver's perception is added also to the vehicle speed V.

A constant yaw rate γ to the vehicle speed V and steering angle θs is denoted by the following formula (2).

$$\gamma = V/(1 + Ks \times V^2) \times (\theta s/N/L) \quad (2)$$

Here, N is a steering gear ratio, L is a wheel base, and Ks is stability factors.

Moreover, a regular lateral acceleration Gy is approximately obtained by multiplying both sides of the equation (2) by V as in the following formula (3) (refer to FIG. 5D).

$$Gy = V^2/(1 + Ks \times V^2) \times (\theta s/N/L) \quad (3)$$

Figure 5B:
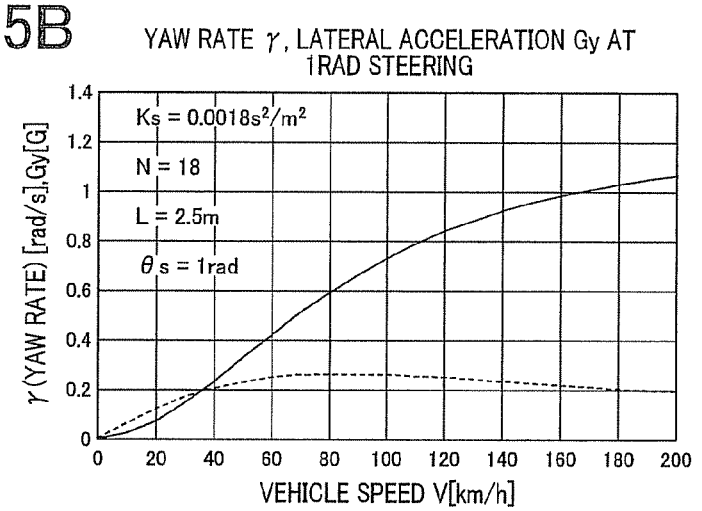
Figure 5D:
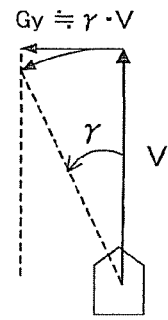

The relationship of the constant yaw rate γ to the vehicle speed V and the example of the characteristics of the regular lateral acceleration Gy when turning the steering wheel one rad are shown in FIG. 5B.

The example of the characteristics in FIG. 5B shows that the vehicle movement will increase if the vehicle speed V increases even if the steering angle is the same.

Although the constant yaw rate γ decreases from above a certain speed, a part of γV may come out if the quantity of horizontal movements per unit time is used, thus, it becomes the same as that of the regular lateral acceleration Gy, becomes a monotonous increase to the vehicle speed V.

When the driver is feeling a stimulus such as the lateral acceleration and the quantity of horizontal movements to a unit steering angle as the steering torque (steering reaction), the quantity of the target steering torque Ts* may be decided by a logarithmic function to the vehicle speed V in order to keep in a steady feeling, not too light and not too heavy, even if the vehicle speed V increases.

That is, the final target steering torque Ts* may be generated by, for example, setting up a gain (target steering torque gain) Kg as shown in the following formula (4), and multiplying the target steering torque Ts* of the formula (1) by the target steering torque gain Kg.

$$Kg = C \times \log(V^2/(1+Ks \times V^2) \times (1/N/L)) + D \quad (4)$$

Figure 5C:
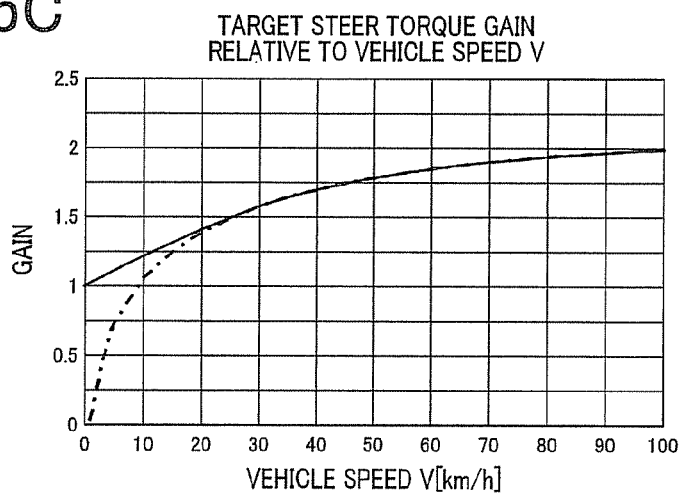

In the formula (4), when referred to as C=0.25 and D=1.5 as an example, the target steering torque gain Kg to the vehicle speed V is obtained as shown in FIG. 5C.

However, since the logarithm cannot be calculated when a stop (when the vehicle speed V=0), the vehicle speed V is asymptotic to a fixed value, such as 1, as shown in FIG. 5C.

The target steering torque Ts* that changes logarithmically to the estimated force Tx and the vehicle speed V can be generated by such a computing.

However, when having the target steering torque Ts* actually computed by the ECU 15, it is given as a map as shown in FIG. 6 so that fine adjustment may be possible.

FIG. 6 shows a map that expresses the relation between the estimated force Tx and the target steering torque Ts* for every 20 km/h when adoption by a real vehicle.

As shown in FIG. 6, the target steering torque Ts* tends to increase logarithmically relative to the rise of the estimated force Tx and to saturate with the rise of the vehicle speed V (namely, also increase logarithmically relative to the vehicle speed V).

Thus, the driver can feel a linear response by making the change of the target steering torque Ts* to be a logarithmic function relative to the change of the estimated force Tx.

In addition, specific numerical values, inclination, etc. of the map of FIG. 6 are finely adjusted suitably according to the vehicle.

The target generating section 22 requests the estimated force Tx and the target steering torque Ts* relative to the vehicle speed V that are inputted by linear interpolation based on the map.

In addition, although the map for Tx<0 is not shown, it becomes a map with a shape of an origin symmetry to the map of FIG. 6.

Next, the controller section 24 is a means for modifying a transfer feeling or a steering feel (stiffness from the steering wheel to the tire) when steering operation. As shown in FIG. 3, the controller section 24 has an assist controller 61, three modifying filters 62, 63, and 64, a transfer system scheduler 65, and a weighting section 66.

Figure 7:
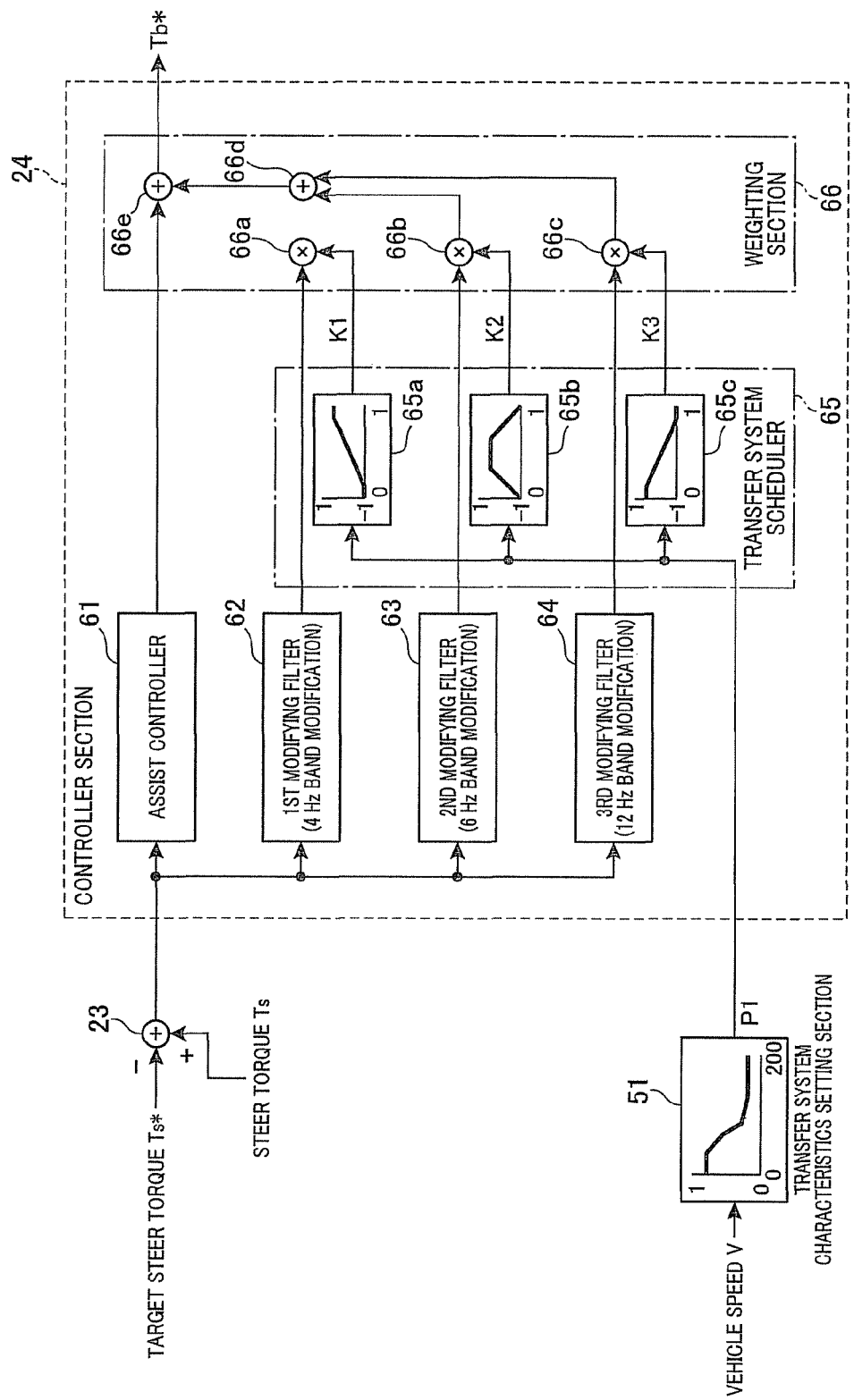
FIG. 7 is a block diagram showing a specific composition of a controller section.

The more specific composition of the controller section 24 is shown in FIG. 7.

As shown in FIG. 7, a torque deviation computed by the deviation computer 23 is inputted into the assist controller 61 and the three modifying filters 62, 63, and 64.

The assist controller 61 generates a basic command used as a base of the base assist command Tb* that the controller section 24 finally generates and outputs.

The assist controller 61 may or may not include an integrator as a component.

Figure 8:
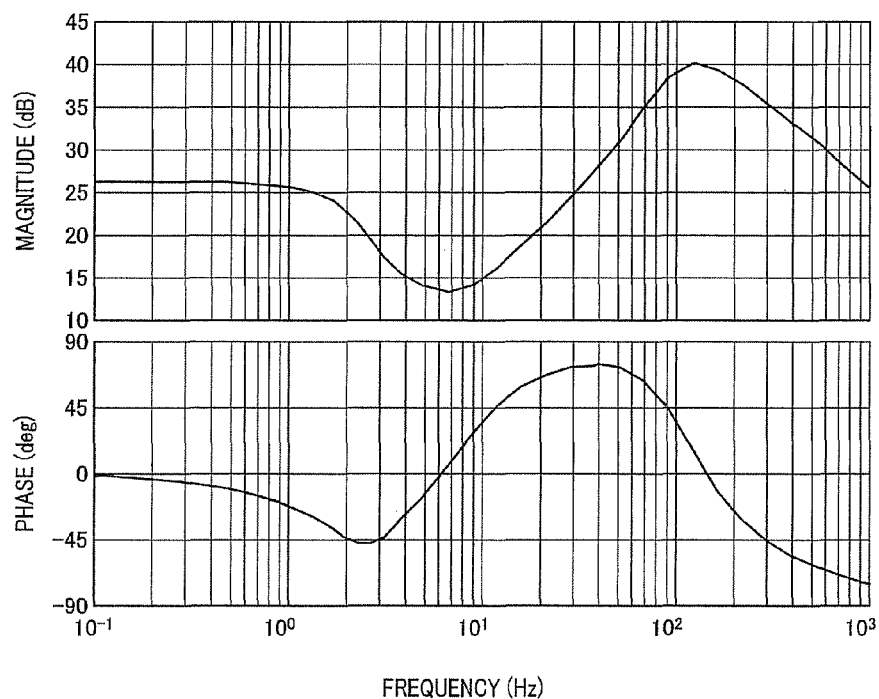
FIG. 8 is a characteristics diagram showing frequency characteristics of an assist controller that constitutes the controller section.

The frequency characteristic of the assist controller 61 that does not include the integrator is shown in FIG. 8.

As shown in FIG. 8, a gain characteristic of the assist controller 61 is a high gain (10 or more times) in a low frequency wave (generally 1 Hz or less).

In order to secure stability of the steering system mechanism 100, the gain is gradually reduced above 1 Hz, while the gain is increased gradually from 10 Hz. to about 100 Hz by giving a differentiation element.

Especially a region of 1 to 20 Hz is the region that influences the steering feel when the steering wheel is operated.

For example, if there is a local minimum at 6 Hz, a connection from the steering wheel to the tire receives a hard impression.

On the other hand, the steering feels soft if there is a local minimum around 6 Hz.

Moreover, it has been confirmed experimentally that stiffness arising from the steering or stiffness arising from the tire grip on the road depend on frequency.

In the present example, a fundamental controller is used only as the assist controller 61, and the basic command that serve as a base by the assist controller 61 is generated.

A plurality of filters for modifying basic command is prepared independently from the assist controller 61, and a weighted sum is used to produce a total modifying value, then the basic command is modified by using the total modifying value.

Specifically, as shown in FIG. 7, as for a plurality of filters, there is provided a first modifying filter 62 for modifying (increasing locally) a gain of a 4 Hz band (4 Hz and its neighborhood), a second modifying filter 63 for modifying (increasing locally) a gain of a 6 Hz band (6 Hz and its neighborhood), and a third modifying filter 64 for modifying (increasing locally) a gain of a 12 Hz band (12 Hz and its neighborhood).

Examples of frequency characteristics of each filter 62, 63, and 64 are shown in FIG. 9A to FIG. 9C.

Clearly from FIG. 9A to FIG. 9C, the gain characteristic of each filter 62, 63, and 64 is increasing locally in the corresponding frequency band (it has a local maximum).

On the other hand, the transfer system characteristics setting section 51 has a map that computes a transfer characteristics preset value P1 (within the limits of P1=0-1) relative to the vehicle speed V by using the vehicle speed V as a parameter as shown in FIG. 7.

As a whole, the map shows a tendency that the transfer system characteristics preset value P1 decreases as the vehicle speed V increases.

Moreover, the transfer system characteristics preset value P1 is for deciding the weighting of the modification by the three modifying filters 62, 63, and 64 according to the vehicle speed V.

The transfer system characteristics setting section 51 computes the transfer characteristics preset value P1 based on the map relative to the inputted speed V, and inputs P1 into the transfer system scheduler 65 in the controller section 24.

The transfer system scheduler 65 configures transfer system modifying gains K1, K2, and K3 that show the heaviness of the modifying value from each filter 62, 63, and 64, respectively, according to the transfer system characteristics preset value P1 (i.e., responding to the vehicle speed V).

Specifically, the transfer system scheduler 65 has a first scheduler 65a for configuring the first transfer system modifying gain K1 that shows the heaviness of a first modifying value of the first modifying filter (4-Hz band modifying) 62, a second scheduler 65b for configuring the second transfer system modifying gain K2 that shows the heaviness of a second modifying value of the second modifying filter (6-Hz band modifying) 63, and a third scheduler 65c for configuring the third transfer system modifying gain K3 that shows the heaviness of a third modifying value of the third modifying filter (12-Hz band modifying) 64.

Each scheduler 65a, 65b, and 65c is given as a map in the present embodiment, and each transfer system modifying gain K1, K2, and K3 is computed by using a map corresponding to the inputted transfer system characteristics preset value P1.

The first scheduler 65a has the characteristics that the first transfer system modifying gain K1 increases from −1 to +1 as the transfer system characteristics preset value P1 increases from 0 to 1 as shown in FIG. 7.

That is, the lower the vehicle speed V, the first transfer system modifying gain K1 becomes large, and the higher the vehicle speed V, the first transfer system modifying gain K1 becomes small.

The second scheduler 65b has the characteristics (trapezoid-shaped characteristics) that when the transfer system characteristics preset value P1 increases from 0 to 1 as shown in FIG. 7, the second transfer system modifying gain K2 reaches from −1 to +1 by predetermined inclination, and +1 is held for a while, then K2 decreases from +1 to −1 by predetermined inclination.

That is, the second transfer system modifying gain K2 decreases when that the vehicle speed V becomes low or high in a low and high speed regions, and the second transfer system modifying gain K2 becomes a large value (+1) when the vehicle speed V is in a mid-speed region.

As shown in FIG. 7, the third scheduler 65c has characteristics that the third transfer system modifying gain K3 decreases from +1 to −1 as the transfer system characteristics preset value P1 increases from 0 to 1.

That is, the lower the vehicle speed V, the third transfer system modifying gain K3 becomes small, and the faster the vehicle speed V, the third transfer system modifying gain K3 becomes large.

As for the quantity of the first modifying from the first modifying filter 62, the first transfer system modifying gain K1 from the first scheduler 65a is integrated at the first integrator 66a.

As for the quantity of the second modifying from the second modifying filter 63, the second transfer system modifying gain K2 from the second scheduler 65b is integrated at the second integrator 66b.

As for the quantity of the third modifying from the third modifying filter 64, the third transfer system modifying gain K3 from the third scheduler 65c is integrated at the third integrator 66c.

The total quantity of transfer system modifying is obtained by adding each integrated value by the adder 66d.

That is, each modifying quantity from each modifying filter 62, 63, and 64 is given the weighted sum.

Thus, the basic command is modified by adding the total quantity of transfer system modifying obtained by addition with weighting to the basic command from the assist controller 61 with the adder 66e.

The modified result is outputted as the base assist command Tb*.

Figure 10:
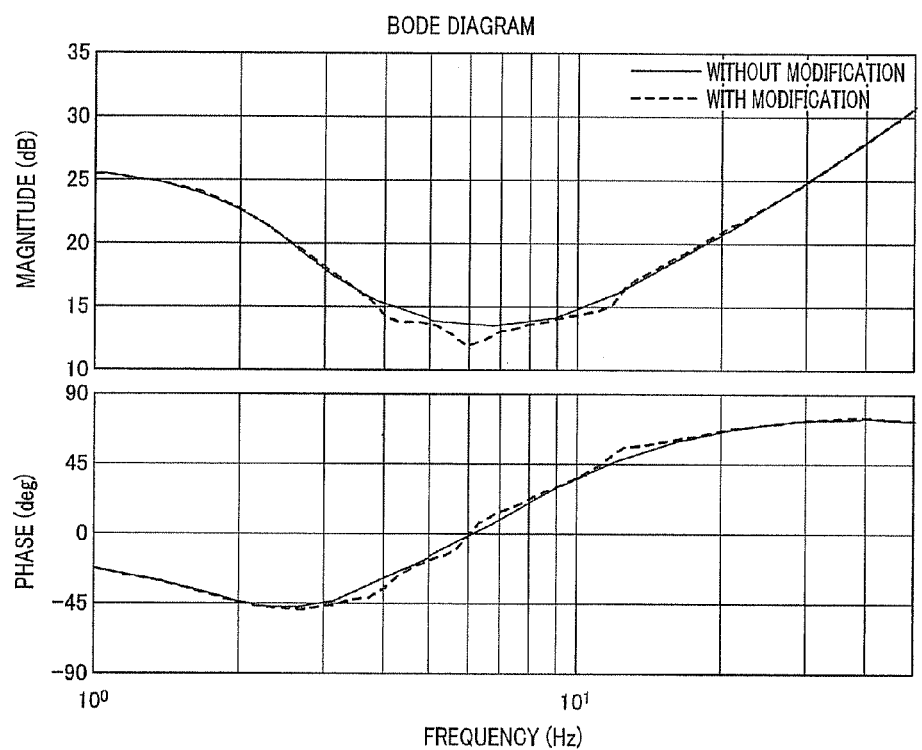
FIG. 10 is a characteristics diagram showing transfer characteristics (frequency characteristics) of input and output of an entire controller section.

Here, assuming that each transfer system modifying gain K1, K2, and K3 is −1 (such a case never happens in the present embodiment though), for example, a gain of each 4, and 12-Hz zone will fall in input-and-output transfer characteristics of the entire controller section 24, as shown in FIG. 10.

Figure 11:
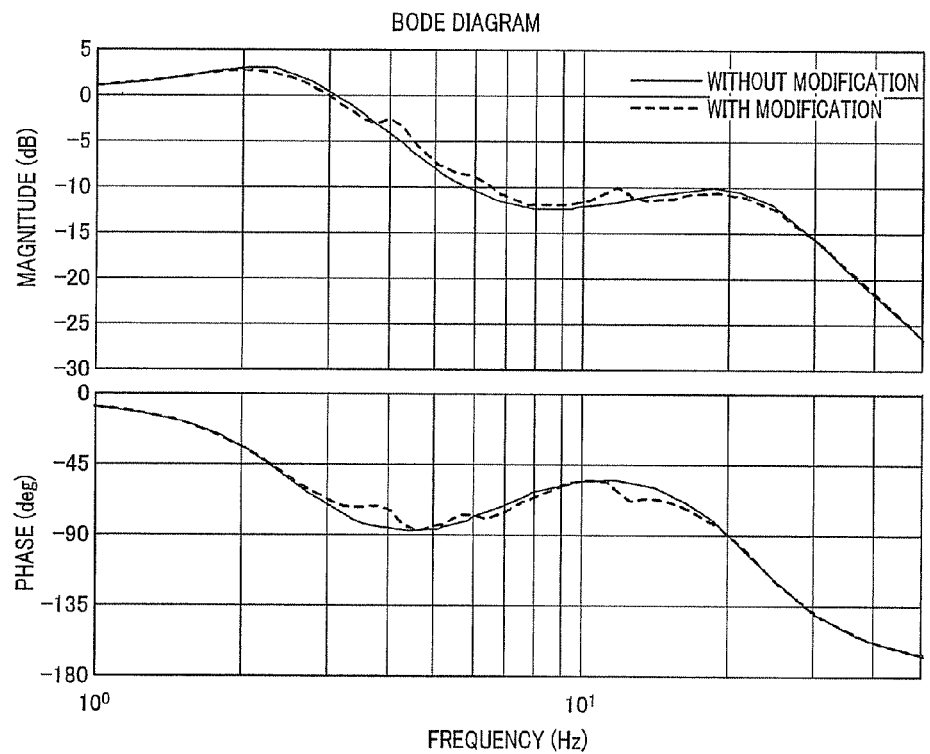
FIG. 11 is a characteristics diagram showing the transfer characteristics (frequency characteristics) of steering torque relative to steering wheel torque.

When such modifying is performed, the response of the steering torque Ts to a steering wheel torque (torque added by the driver) becomes as the characteristics shown in FIG. 11.

That is, a gain increases in a specific frequency band by the modification of each modifying filter 62, 63, and 64.

Although examples of modifying the basic command in three ranges (4, 6 and 12 Hz) are presented in the present embodiment, the higher the frequency component to which the modifying is applied, the more quickly the steering torque signal rises.

In other words, the responsiveness of the steering reaction when the driver steers change by the frequency to which its attention is paid or the gain on the transfer characteristics shown in FIG. 11.

The faster the timing of the steering reaction, and the larger the amplitude of the steering reaction, the more rigidity is felt by the driver in the steering system mechanism in connection with a transfer of the force from the steering wheel to the vehicle body.

On the other hand, the slower the timing of the steering reaction, the slower and less responsive is the feeling of the steering.

Relating to specific parts of the vehicle, 12 Hz creates an impression that a linkage mechanism from the steering wheel to the tire is stiff, 6 Hz creates an impression that a shock absorber is hard, and 4 Hz creates an impression that the response of suspended portions of the vehicle body becomes good.

Since the range that contributes to such feeling is 1 to 20 Hz in general, it is preferred that modifying be performed in one or a plurality of frequency bands (three bands in the present embodiment) that are distributed appropriately within the range of 1 to 20 Hz.

Thereby, characterization to the vehicles such as to decide where to receive a hard impression, for example, between the steering wheel, the tire and the vehicle body can be performed arbitrarily.

In addition, it all differs with the vehicles what kind of impression is received in which frequency band, and above-mentioned 4, 6 and 12-Hz are only the examples.

With the present embodiment, each transfer system correction coefficient K1, K2, and K3 is separately configured by each scheduler 65a, 65b, and 65c according to the transfer system characteristics preset value P1 inputted into the transfer system scheduler 65.

That is, when the transfer system characteristics preset value P1 is 0, the scheduler 65a is mapped so that stiffness of the linkage mechanism near the hands is improved by mainly adding modification of the 12-Hz band.

Moreover, when the transfer system characteristics preset value P1 is 1, the scheduler 65b is mapped so that the response of the body comparatively far from the hands feels increasing by mainly adding modification of the 4-Hz band.

Then, when the transfer system characteristics preset value P1 is a mean value of 0-1, the scheduler 65c is mapped so that the hardness of the shock absorber feels increasing up by mainly adding modification of the 6-Hz band.

Moreover, a map in which the vehicle speed V and the transfer system characteristics preset value P1 are matched 1 to 1 is prepared in the transfer system characteristics setting section 51 so that the response of the vehicle body has a priority when the vehicle speed V is low, and creates machine-like hardness and shows a steady feeling when the vehicle speed V is high.

That is, the transfer system characteristics preset value P1 is configured larger when a low speed, and the transfer system characteristics preset value P1 is configured smaller when a high speed.

The transfer system characteristics setting section 51 computes and outputs the transfer system characteristics preset value P1 relative to the vehicle speed V based on the map.

Since each map of the transfer system characteristics setting section 51 and the transfer system scheduler 65 are said to be the parts that show the character of the vehicles, each map may be suitably adjusted according to the vehicle's concept etc.

Although the assist controller 61 is explained without an integrator so far, a composition having the integrator that integrates the inputted torque deviation may be employed.

Figure 12A:
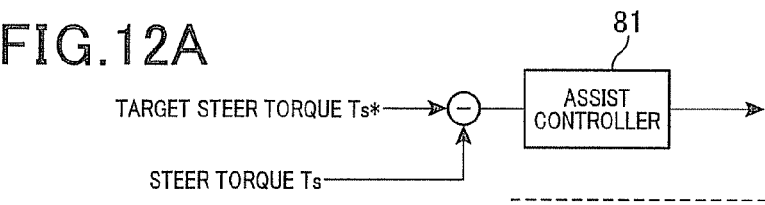
FIG. 12A to FIG. 12D are diagrams for explaining examples of compositions of the assist controller including an integrator.
Figure 12B:
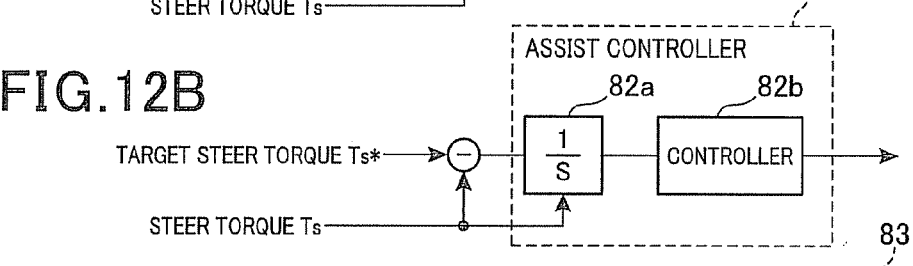
Figure 12C:
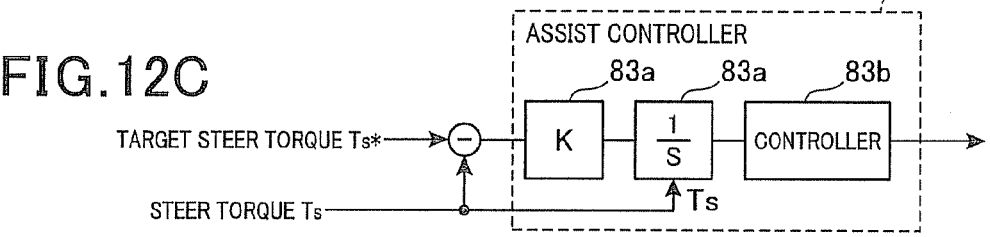

An example of the composition of the assist controller that has the integrator is shown in FIG. 12A to FIG. 12C.

An assist controller 81 of FIG. 12A has an integrator therein relative to the assist controller 61 shown in FIG. 7.

Figure 12D:
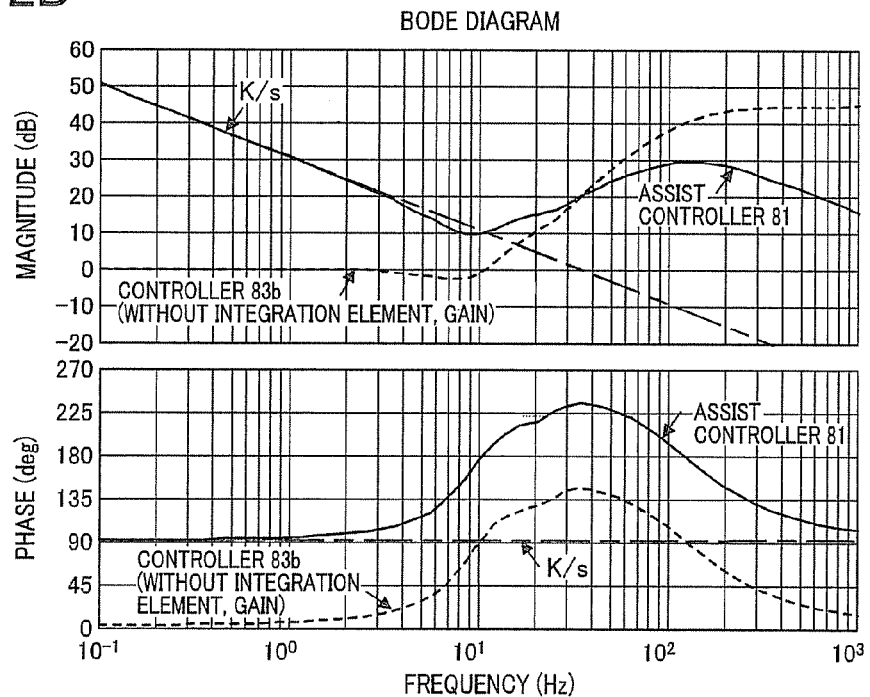

Therefore, the frequency characteristics of the assist controller 81 turn into the characteristics that the lower the frequency, the gain increases in a region of 10 Hz or less shown as a solid line in FIG. 12D.

The assist controller 81 has an integration element, and generates base assist command Tb* for controlling the motor 6 so that that input (deviation of the target steering torque Ts* and the steering torque Ts) becomes 0.

Since it has a low frequency characteristics as shown in FIG. 12D by having the integral element, following to the target steering torque Ts* of the steering torque Ts can be performed without a steady state error by using the assist controller 81.

However, when a turning of the steering requires assistance in an opposite direction, when having the integration element, the integration accumulated until then will act in the direction that blocks the steering of the opposite direction.

Then, in order to solve such problems, it is recommended to constitute the assist controller by which the integrator and the controller are separated.

Specifically, the integrator 82a and the controller 82b may be an in-series structure as the assist controller 82 shown in FIG. 12B.

The controller 82b is what extracted the integrator 82a from the assist controller 81 (transfer function) of FIG. 12A.

Furthermore, the gain K83a may be further extracted from the controller 82b of FIG. 12B and placed before the integrator 82a like the assist controller 83 shown in FIG. 12C to form the in-series structure of the gain K83a, the integrator 82a, and the controller 83b.

Since the controller 83b does not have the gain K83a and the integrator 82a, the frequency characteristics are shown with a dashed line in FIG. 12D.

Moreover, the frequency characteristics of the in-series structure (namely, K/s) of the gain K83a and the integrator 82a are shown in FIG. 12D with a long-and-short dashed line.

Further, the integrator 82a may have a composition that an upper limit is applied to the absolute value of the integration output.

Specifically, the steering torque Ts is inputted to the integrator 82a as shown in FIG. 12B and FIG. 12C.

Moreover, the function of suppressing, or as so called a limiter is given to the integrator 82a so that the absolute value of own integration output may not exceed the predetermined times (equivalent to the integration upper limit of the present disclosure) of the absolute value of the steering torque Ts.

In addition, how the upper limit of the absolute value of the output of the integrator 82a is configured can be decided suitably.

In addition to the steering torque Ts, the upper limit may be configured based on a quantity of state of such as a rotation angle of the steering wheel, a rotation angle of the motor 6, or the base assist command Tb* to become large as the quantity of state increases.

Thus, by providing the upper limit to the absolute value of the integration output, accumulation of the integration value more than needed by the turning of the steering is eliminated, and the assistance in the steering direction until then when turning the steering decreases without continuing, therefore, steerage inhibition in the steering direction caused by the accumulation of the integration value can be suppressed.

The torque modifying section 31 in the vehicle control computing section 70 (modifying section 30) is explained using FIG. 3.

The torque modifying section 31 is a means to realize suitable operation stability (suitable vehicle movement characteristics) as the whole vehicle.

The torque modifying section 31 has a first vehicle movement controller 71, a second vehicle movement controller 72, a vehicle system scheduler 73, and a weighting section 74.

The first vehicle movement controller 71 is for improving convergence by inputting signals of the steering torque Ts and the motor speed ω, and specifically, the convergence control mechanism disclosed in the publication '913 can be applied.

That is, it is the technology for improving convergence of the vehicle by reducing a sudden feeling of returning while not spoiling the feeling of operation when turning the steering wheel, and generates a first modifying quantity based on the steering torque Ts and the motor speed ω.

Since a specific method of generating a second modifying quantity based on the steering torque Ts and the motor speed ω is disclosed in the publication '913, detailed explanation are omitted here.

Moreover, the second vehicle movement controller 72 is a controller for modifying the movement characteristics of the suspended portions of the vehicle body, and specifically, the torque modifying technology in the control mechanism disclosed in the publication '373 can be applied.

That is, the quantity of torque modifying (a second compensation quantity) that modifies the base assist command Tb* for changing the yaw response characteristics in early stages of steering is generated based on the estimated force Tx that shows the sum of the base assist command Tb* and the steering torque Ts.

Since a specific method of generating a second modifying quantity based on the estimated force Tx is disclosed in the publication '373, detailed explanation are omitted here.

In addition, the torque modifying command Tr is obtained by the weighted sum of each modifying quantity from each vehicle movement controller 71 and 72 in the weighting section 74.

In the weighted sum, how the heaviness of each modifying quantity is configured is configured by the vehicle system scheduler 73.

The vehicle system scheduler 73 configures the heaviness of each modifying quantity according to the various vehicle movement characteristics preset values inputted from the vehicle movement characteristics setting section 52.

The vehicle movement characteristics setting section 52 determines the vehicle movement characteristics preset value (for example, the yaw attenuation value ζ and speed of response (stabilization time) R) relative to the vehicle speed V by map calculation using speed V as an parameter, and transmits the value to the vehicle system scheduler 73.

A map that shows the heaviness distribution for realizing the yaw attenuation value ζ and the stabilization time R is beforehand configured to the vehicle system scheduler 73 based on the result of function evaluations.

Then, the vehicle system scheduler 73 computes a first gain for fluctuating attenuation of yaw rate by map calculation according to the vehicle movement characteristics preset value from the vehicle movement characteristics setting section 52.

The first gain shows the heaviness of the first modifying quantity.

Although the constant yaw rate according to the vehicle speed V is explained using the formula (2) etc. in the above-mentioned functional explanation of the target generating section 22, it is known that it tends to show the rise of resonance frequency and the attenuation fall along with the rise of the vehicle speed V if transient is included.

Since the attenuation fall causes unease when driving the vehicle, a desired attenuation is realized by convergence control by the first vehicle movement controller 71 so that the attenuation does not fall.

The vehicle can be easy to be familiar with when the reaction to the operation becomes uniform by matching the feeling of the driver so that the quantity of attenuation becomes the same even if the vehicle speed V changes, or a setting time is adjusted to be the same when the hands are released from the state that attained predetermined lateral acceleration.

Moreover, the vehicle system scheduler 73 computes the gain according to the vehicle speed V or indexes that show the response by map calculation according to the vehicle movement characteristics preset value from the vehicle movement characteristics setting section 52 to obtain a second gain.

The second gain shows the heaviness of the second modifying quantity.

Further, the first gain from the vehicle system scheduler 73 is integrated in the weighting section 74 from the first vehicle movement controller 71 to the first modifying quantity, and the second gain from the vehicle system scheduler 73 is integrated from the second vehicle movement controller 72 to the second modifying quantity.

The torque modifying command Tr as a result of the weighted sum of each modifying quantity is obtained by adding each addition result.

Figure 13A:
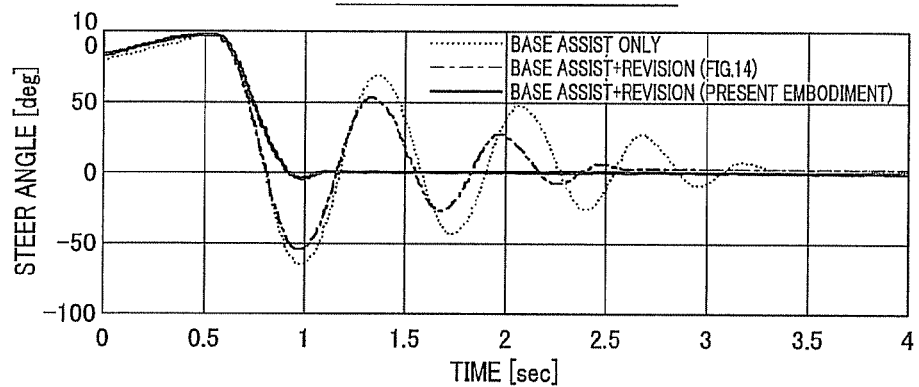
FIG. 13A to FIG. 13C are diagrams for explaining effects of a control mechanism of the present embodiment.
Figure 13B:
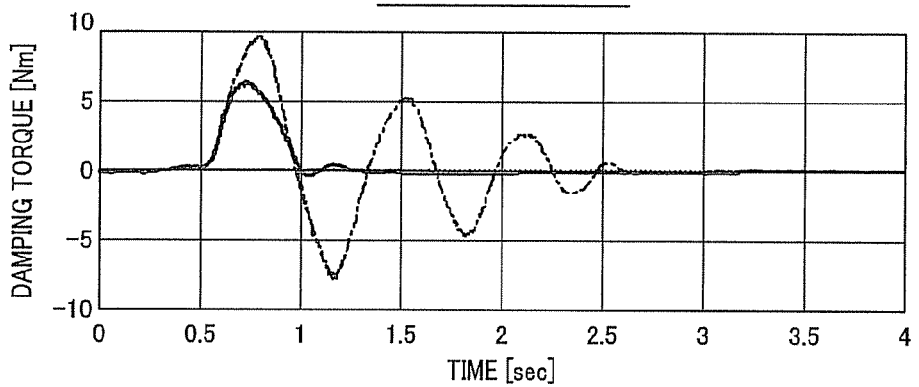
Figure 13C:
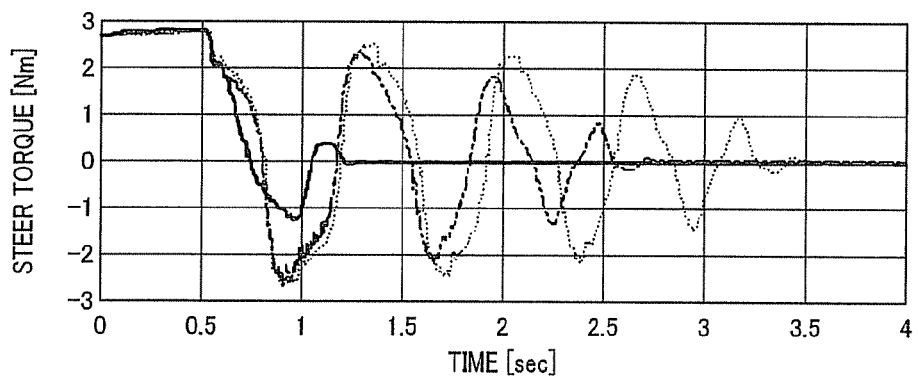

Situations of convergence when the steering wheel is steered about 90 degrees from a neutral state and the hands are released are shown in FIG. 13A to FIG. 13C as examples of the electric power-steering system 1 of the present embodiment constituted accordingly.

In FIG. 13A to FIG. 13C, FIG. 13A shows a change of steering wheel angle θs, FIG. 13B shows a change of the torque modifying command Tr, and FIG. 13C shows a change of the steering torque Ts.

Moreover, in each waveform of FIG. 13A to FIG. 13C, a dotted line shows the change when controlling the base assist command Tb* from the base assist section 20 simply considering the assist torque command Ta (i.e., having no modification by the modifying section 30).

Further, a long-and-short dashed line shows the change when controlling by a control composition (namely, simple combination of the publications '089 and '913) shown in FIG. 14.

That is, although the torque modifying is added, it is a control result in the control composition using the motor current Im that corresponds to a final command value with the steering torque Ts for estimating the road surface force.

Furthermore, a solid line shows the change when controlling by the ECU 15 of the present embodiment.

It is clear from FIG. 13A to FIG. 13C that, since the modifying for vehicle movement stabilization is not made when only the base assisting is employed (having no modifying), vibration does not immediately settle and convergence takes time.

On the other hand, when the control composition shown in FIG. 14 is employed, the time that convergence takes becomes shortened compared with the case where there is no modifying.

However, since the control output as the result modified in the modifying section 130 is used when the base assist section 120 generates the base assist command Tb* in the control composition of FIG. 14 as mentioned above, the base assist section 120 cancels the modifying operation by the modifying section 130.

That is, the base assisting and the torque modifying interfere, and sufficient convergence is not performed.

On the other hand, in the control mechanism (the ECU 15) of the present embodiment, the base assisting and the torque modifying exist independently, and since two degree-of-freedom systems to which a mutual command value is added is built, there is almost no influence of interference between the base assisting and the torque modifying, and, therefore, quick convergence is realized.

As explained above, according to the electric power-steering system 1 (especially the ECU 15) of the present embodiment, because the base assist section 20 generates the base assist command Tb* according to the road surface force, the assistance according to the reaction received from the road surface when steering is performed, and the reaction corresponding to the power applied to the tire appears in the steering wheel fairly constant.

Therefore, it becomes easy to grasp the state of the vehicle and the state of the road surface.

Moreover, the unstable movement of the vehicle can be appropriately converged because the modifying section 30 generates the torque modifying command Tr that can converge the vehicle stably.

In addition, the function to configure the target steering torque Ts* according to the estimated force Tx by estimating the road surface force is closed within one loop (base assist section 20), and the function is separated from the modifying section 30 in the present embodiment.

Therefore, interference between the both can be minimized (or removed completely).

By this, realization of the characteristics of the steering reaction according to the road surface force by the base assist section 20 and realization of the suitable operation stability (suitable vehicle movement characteristics) as the whole vehicles by the modifying section 30 can be reconciled, hence the running performance of the vehicle can be improved.

It should be appreciated that the steering shaft 3 in the present embodiment corresponds to an input shaft of the present disclosure.

A whole mechanism by the side of a downstream (tire 10 side) of the steering shaft 3 in the steering system mechanism 100 corresponds to an input transmitting means of the present disclosure.

The rotation sensor in the motor 6 corresponds to a steering speed information acquisition means of the present disclosure.

The base assist section 20 corresponds to a basic assist quantity generating means of the present disclosure.

The modifying section 30 corresponds to an assist compensation quantity generating means of the present disclosure.

The adder 41 corresponds to an assist quantity modifying means of the present disclosure.

The current FB section 42 corresponds to a motor driving means of the present disclosure.

The force estimator 21 corresponds to a road surface force estimating means of the present disclosure.

The target generating section 22 corresponds to a target steering torque computing means of the present disclosure.

A basic assist quantity computing means of the present disclosure is realized by the deviation computer 23 and the controller section 24, and the assist controller 61 corresponds to a basic command computing means of the present disclosure.

The weighting section 66 in the controller section 24 corresponds to a first weighted sum calculating means of the present disclosure.

The first vehicle movement controller 71 and the second vehicle movement controller 72 are all correspond to a basic compensation quantity computing means of the present disclosure.

Moreover, the base assist command Tb* corresponds to a basic assist quantity of the present disclosure.

The torque modifying command Tr corresponds to the assist compensation quantity of the present disclosure.

The assist torque command Ta corresponds to a modified assist quantity of the present disclosure.

The output from the assist controller 61 corresponds to a basic command of the present disclosure.

Each output from each vehicle movement controller 71 and 72 corresponds to a basic compensation quantity of the present disclosure.

Each gain K1, K2, and K3 outputted from the transfer system scheduler 65 is all equivalent to a first weighting configuring command of the present disclosure.

MODIFICATION

Although the embodiment of the present disclosure is explained above, embodiments of the present disclosure is not limited to the above-mentioned embodiment at all, and needles to mention that various forms can be employed as long as it belongs to the technical scope of the present disclosure.

For example, although the cutoff frequency of LPF 21b is set to 10 Hz in the force estimator 21 shown in FIG. 4, this is just an example, and which band to be passed (which band to be cut) can be decided suitably.

Moreover, it is not necessary to use the LPF itself, and as long as a desired frequency component can be passed (an unnecessary ingredient is intercepted), the composition and the passage frequency band (cutoff frequency band) of a filter can be determine suitably.

Moreover, in the controller section 24 shown in FIG. 7, considering the number of modifying filters to three (each modifying filter 62, 63, and 64), considering the number of the schedulers that constitute the transfer system scheduler 65 to three (each scheduler 65a, 65b, and 65c), considering the range of each gain K1, K2, and K3 to −1 to +1, and considering the range of the transfer system characteristics preset value P1 to 0 to 1 are only examples.

Moreover, it is not necessary to perform a heaviness configuration by each scheduler 65 and 73 according to the vehicle speed V.

For example, the heaviness configuration may be fixed beforehand or may be configured according to other physical value and quantity of state other than the vehicle speed V.

Assigning each scheduler 65 and 73 with what kind of output characteristics relative to the inputted characteristics preset value (that is, having a map with what kind of characteristics) can also be decided suitably.

Moreover, regarding each characteristics setting section 51 and 52, assigning with what kind of output characteristics to the vehicle speed V can also be decided suitably.

Further, it is not necessary either to have each modifying filter 62, 63, and 64 in the controller section 24, but the output from the assist controller 61 may be outputted simply as the base assist command Tb*.

Furthermore, it is not necessary either to provide a plurality of (two in the present embodiment) vehicle movement controllers in the torque modifying section 31 shown in FIG. 3, but three or more controllers with different characteristics may be provided, or only one controller may be provided.

When providing a single vehicle movement controller, one output from the single vehicle movement controller may be outputted simply as the modifying torque Tr.

Moreover, as shown in FIG. 7, the controller section 24 of the above-mentioned embodiment has a composition of providing the one assist controller 61 used as a base, and is considered to modify the output from the assist controller with each modifying quantity from the three modifying filters 62, 63, and 64.

However, again, such composition is also just an example, a plurality of assist controllers with different frequency characteristics may be provided, for example, and outputs from the assist controllers may be given the weighted sum.

Thus, a controller with performance equivalent to the controller section 24 of the above-mentioned embodiment can be realize by having a plurality of assist controller itself without providing the modifying filter.

Of course, a plurality of assist controllers may be provided with a further addition of one or more modifying filters.

Moreover, regarding the composition of the torque modifying section 31 shown in FIG. 3, this is one example, and various compositions may be employed.

For example, the composition having a vehicle movement controller for convergence control that is designed with a slow stabilization time and a vehicle movement controller for convergence control that is designed with a fast stabilization time can also be employed.

In this case, how much stabilization time R [sec] finally considered with the vehicle speed V is computed based on a map in which the speed and the stabilization time are matched, and adding two outputs of vehicle movement controllers in what kind of distribution relative to the stabilization time R is decided by a map calculation of the scheduler, then a single gain Ka for weighting is obtained.

Assuming that the output obtained by weighting for modifying the stabilization time R is set to Sb, the Sb can be obtained by the following formula (5), for example, when the outputs of two vehicle movement controllers are set to S1 and S2, respectively.

$$Sb=Ka \times S1+(1-Ka) \times S2 \qquad (5)$$

Moreover, an attenuation level $\zeta$ that indicates how much yaw resonance of vehicles is suppressed with the vehicle speed V (i.e., the dumping strength) is computes based on a map in which the speed and the attenuation level are matched, and a single gain Kb for weighting is obtained by a map calculation of the scheduler that can attain the attenuation level $\zeta$.

An output Sx of a final vehicle movement controller (here, convergence control) can be obtained by multiplying the gain Kb by the Sb mentioned above.

In this example, it is preferred that the final stabilization time R is configured to be shorter, for example, in order to make it converge quickly when the vehicle speed V is low, and the final stabilization time R is configured to be longer to some extent when the vehicle speed V is high.

Thereby, return of the steering wheel in a low speed is performed promptly, and, it contributes to reduction of the body swing-back in a roll direction by a quiet convergence action in a high speed.

Moreover, the attenuation level may be configured to be a large value in order to respond to a vehicle yaw vibration that increases as the speed gets faster.

Further, although the brushless DC motor is used as the motor 6 in the embodiment, use the brushless DC motor is just an example, and it may be a DC motor with a brush, for example, or other various motors.

When using the DC motor with the brush, the motor speed ω can be detected by using a rotation sensor, such as an encoder, for example, or estimating from results detected from a terminal voltage and a motor current of the motor.

Moreover, although the motor 6 has the rotation sensor and the motor speed is to be detected by the rotation sensor in the present embodiment, this is also only an example, and where the rotation sensor is placed and how the required information (rotation state of the motor 6 such as the motor speed and the motor rotation angle) is detected can be decided suitably.

Therefore, when the DC motor with the brush is used as the motor 6, for example, a rotation state may be acquired by using a method of presuming a rotation state based on the current that flows into the motor 6 or the like.

Further, as a system of the electric power-steering system 1, a composition of assisting the rotation of the intermediate shaft 5 by the motor 6, or the so-called shaft assist type composition is mentioned as the example and explained in the present embodiment.

However, this is also just an example, and the present disclosure is applicable to the electric power-steering system of various assist systems such as a system that assists the reciprocating movement of the tie rod 8 (namely, the reciprocating movement of the rack in the steering gear box 7) by the motor, or the so-called rack assist type system.

What is claimed is:

1. An electric power-steering control device for an electric power-steering system, the electric power steering system including a motor providing an assist steering power for assisting an operation of turning a steering wheel of a vehicle, the electric power-steering control device comprising:
   a basic assist quantity generator generating a basic assist quantity for assisting the operation of turning the steering wheel, the basic assist quantity generator including:
   a basic assist quantity calculator calculating the basic assist quantity for controlling the motor based on a steering torque detected by a steering torque detector of the electric power-steering system,
   a road surface force estimator estimating a road surface force based on the basic assist quantity and the steering torque detected by steering torque detector, wherein the basic assist quantity generated changes the steering torque according to the road surface force applied to wheels of the vehicle from a road surface, and
   a target steering torque calculator determining a target steering torque, wherein the target steering torque is a desired value of the steering torque and is based on the road surface force estimated by the road surface force estimator, and the basic assist quantity generated controls the motor such that the steering torque detected by the steering torque detector matches the target steering torque determined by the target steering torque calculator;
   an assist compensation quantity generator generating an assist compensation quantity for modifying the basic assist quantity generated by the basic assist quantity generator such that an action of the wheels of the vehicle responds to predetermined action characteristics;
   an assist quantity modifier generating a modified assist quantity by modifying the basic assist quantity generated by the basic assist quantity generator with the assist compensation quantity generated by the assist compensation quantity generator; and
   a motor driver driving the motor based on the modified assist quantity from the assist quantity modifier.

2. The electric power-steering control device according to claim 1, wherein,
   the road surface force estimator extracts an element of a frequency band configured beforehand from a sum of the basic assist quantity and the steering torque, and outputs the ingredient of the extracted frequency band as the estimated force.

3. The electric power-steering control device according to claim 2, wherein,
   the frequency band is 10 Hz or less.

4. The electric power-steering control device according to claim 1, wherein,
   the target steering torque calculator computes the target steering torque so that the larger the estimated force becomes, the target steering torque also becomes larger based on the estimated force estimated by the road surface force estimator.

5. The electric power-steering control device according to claim 4, wherein,
   the target steering torque calculator computes the target steering torque so that the target steering torque changes logarithmically relative to the estimated force.

6. The electric power-steering control device according to claim 1, wherein,
   the target steering torque calculator computes the target steering torque so that the faster a vehicle speed becomes, the target steering torque becomes larger based on the vehicle speed detected by a speed detector of the electric power-steering system.

7. The electric power-steering control device according to claim 6, wherein,
   the target steering torque calculator computes the target steering torque so that the target steering torque changes logarithmically relative to the vehicle speed.

8. The electric power-steering control device according to claim 1, wherein,
   the basic assist quantity calculator has a deviation calculator that computes a torque deviation that is a difference between the steering torque detected by the steering torque detector and the target steering torque computed by the target steering torque calculator, and
   at least one basic command calculator that computes a basic command that corresponds to the basic assist quantity so that the torque deviation computed by the deviation calculator is configured to 0,
   when more than one basic command calculator is provided, a weighted sum of the basic commands computed by each basic command calculator is computed as the basic assist quantity, and
   the basic command calculator is constituted so that a transfer function of the basic assist quantity to be outputted relative to the torque deviation inputted becomes more than a predetermined level with a gain larger than 1 in the band below a predetermined frequency.

9. The electric power-steering control device according to claim 8, wherein,
   the basic command calculator has an integrator that integrates and outputs the torque deviation inputted, and it is constituted that the basic command is computed so that the torque deviation becomes 0.

10. The electric power-steering control device according to claim 9, wherein,
the integrator is constituted so that the absolute value of the integration value outputted is restricted to below a predetermined integration upper limit.

11. The electric power-steering control device according to claim 10, wherein,
the steering torque detected by the steering torque detector, a rotation angle of the steering wheel, a rotation angle of the motor, or the basic assist quantity generated by the basic assist quantity generator is used as a quantity of state for a configuration, and the integration upper limit is configured to be a larger value as the quantity of state for the configuration becomes larger.

12. The electric power-steering control device according to claim 8, wherein,
the predetermined frequency is 1 Hz.

13. The electric power-steering control device according to claim 8, wherein,
the predetermined level is 10 times.

14. The electric power-steering control device according to claim 8, wherein,
the basic assist quantity calculator has a plurality of the basic command calculators with different frequency characteristics, and
a first weighted sum calculator that calculates the weighted sum of the basic command from the plurality of the basic command calculators according to a first weighting configuring command.

15. The electric power-steering control device according to claim 1, wherein,
a steering speed information receiver acquires steering speed information that directly or indirectly shows a revolving speed of the motor, and
the assist quantity modifier generates the assist compensation quantity for converging a movement of the vehicle to the desired behavior based on at least one of the steering speed information acquired by the steering speed information receiver, the steering torque detected by the steering torque detector, and the road surface force estimated by the road surface force estimator.

16. The electric power-steering control device according to claim 15, wherein,
the assist quantity modifier has at least one basic compensation quantity calculator that computes the basic compensation quantity corresponding to the assist compensation quantity for converging the movement of the vehicle, and when there is more than one basic compensation quantity calculator, a weighted sum of each compensation quantity computed by the each basic compensation quantity calculators is computed as the basic assist quantity.

17. An electric power-steering system comprising:
the electric power-steering control device of claim 1;
an input shaft connected with a steering wheel of a vehicle and rotates with the steering wheel;
a rotation input transmitter steering the wheels of the vehicle by transmitting rotation of the input shaft to the wheels;
a steering torque detector detecting a steering torque, wherein the steering torque is a torque applied to the input shaft in an axis rotatory direction; and
a motor providing an assist steering power to the input shaft or the rotation input transmitter for assisting an operation of turning the steering wheel when steering the wheels by an operation of turning the steering wheel.

* * * * *